Oct. 25, 1927.

H. H. POWERS 1,646,870

METHOD OF AND MACHINE FOR MAKING SAWS

Filed March 3, 1921     22 Sheets-Sheet 8

Inventor
Herbert H. Powers
by Foneé Rain Hinkle
Attorneys

Oct. 25, 1927.
H. H. POWERS
1,646,870
METHOD OF AND MACHINE FOR MAKING SAWS
Filed March 3, 1921 22 Sheets-Sheet 9
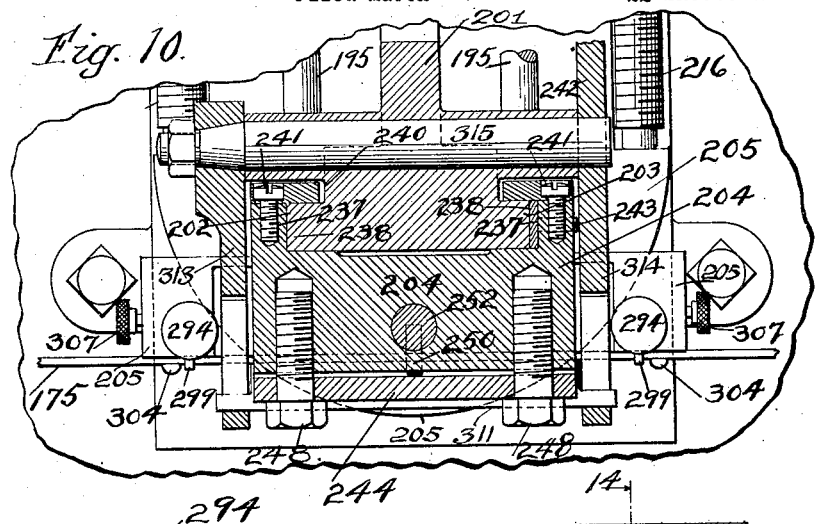
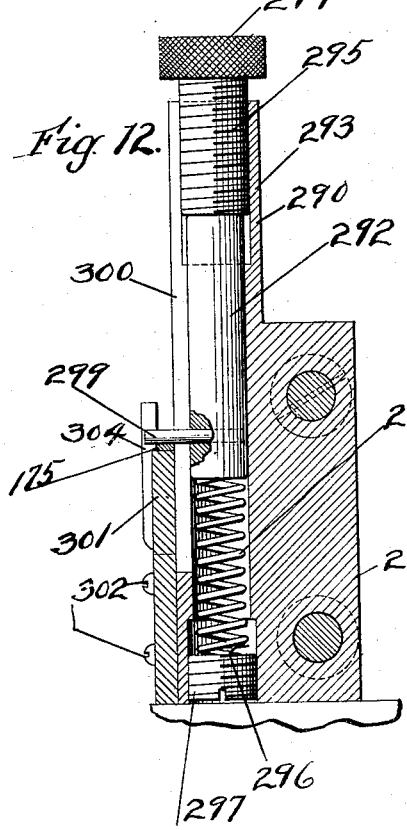
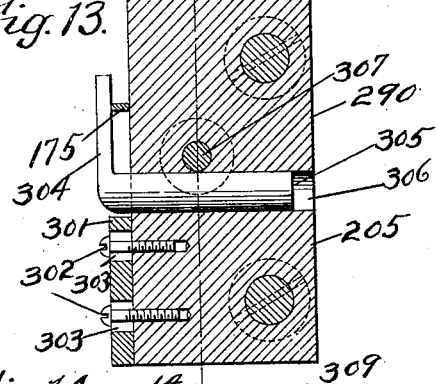
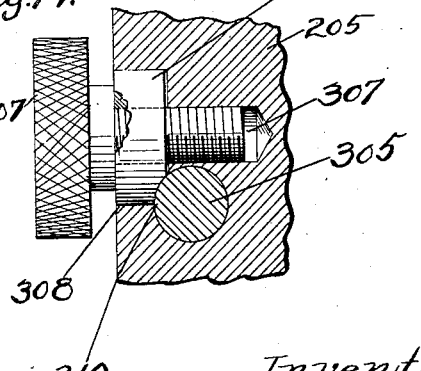
Inventor
Herbert H. Powers
by Foree Bain & Hinkle
Attorneys Oct. 25, 1927.
H. H. POWERS
1,646,870
METHOD OF AND MACHINE FOR MAKING SAWS
Filed March 3, 1921 22 Sheets-Sheet 10
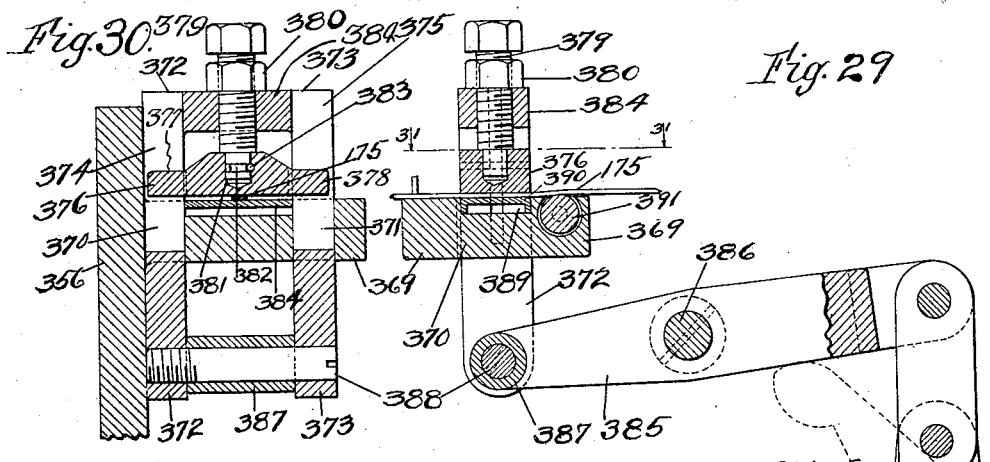
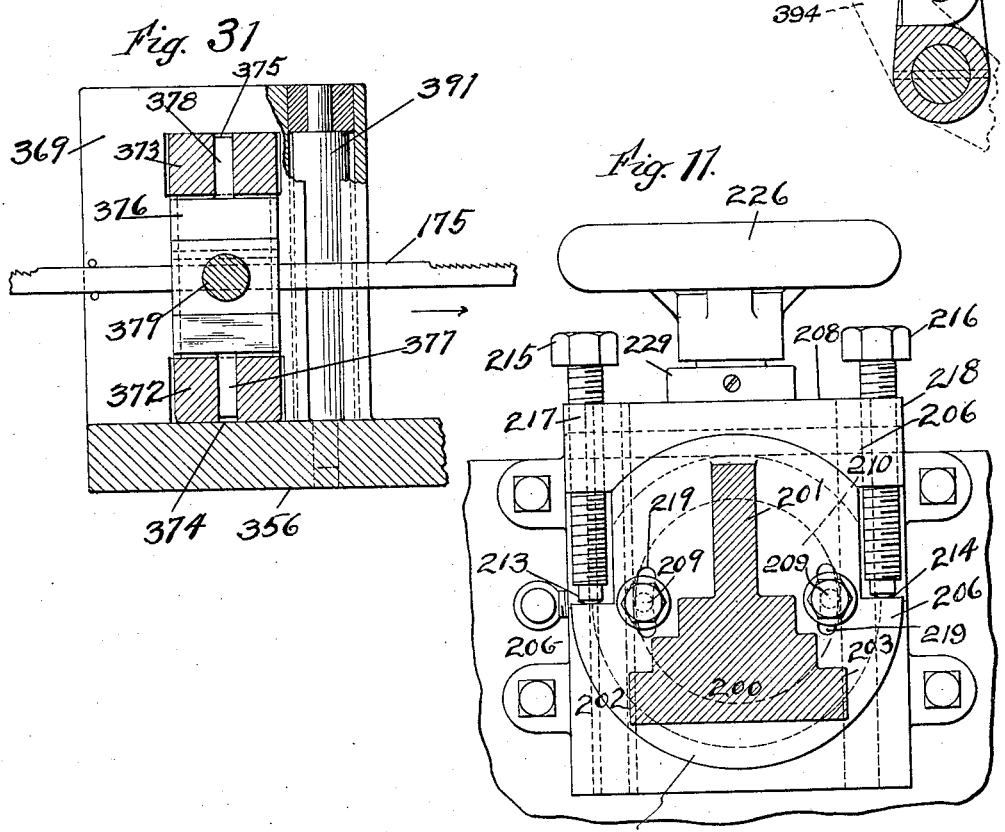

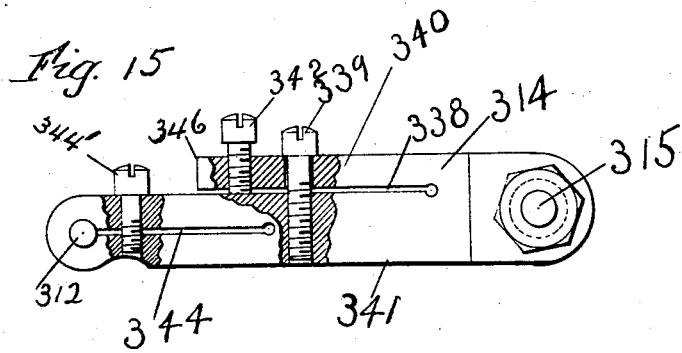
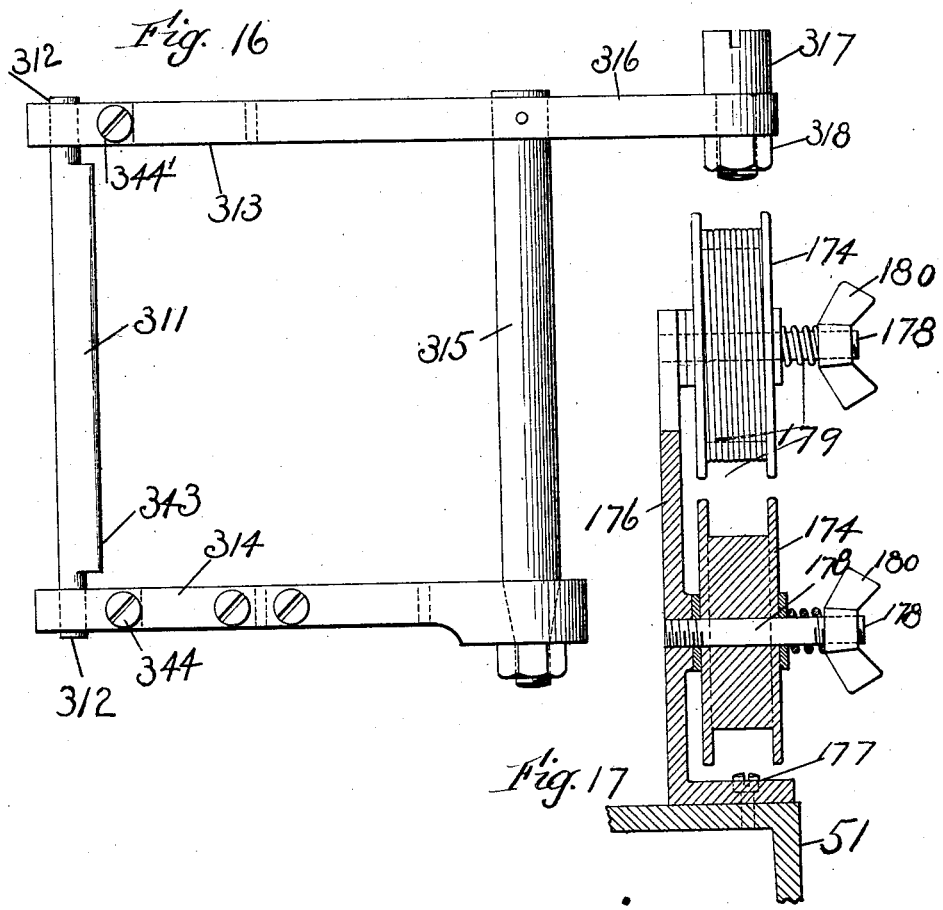

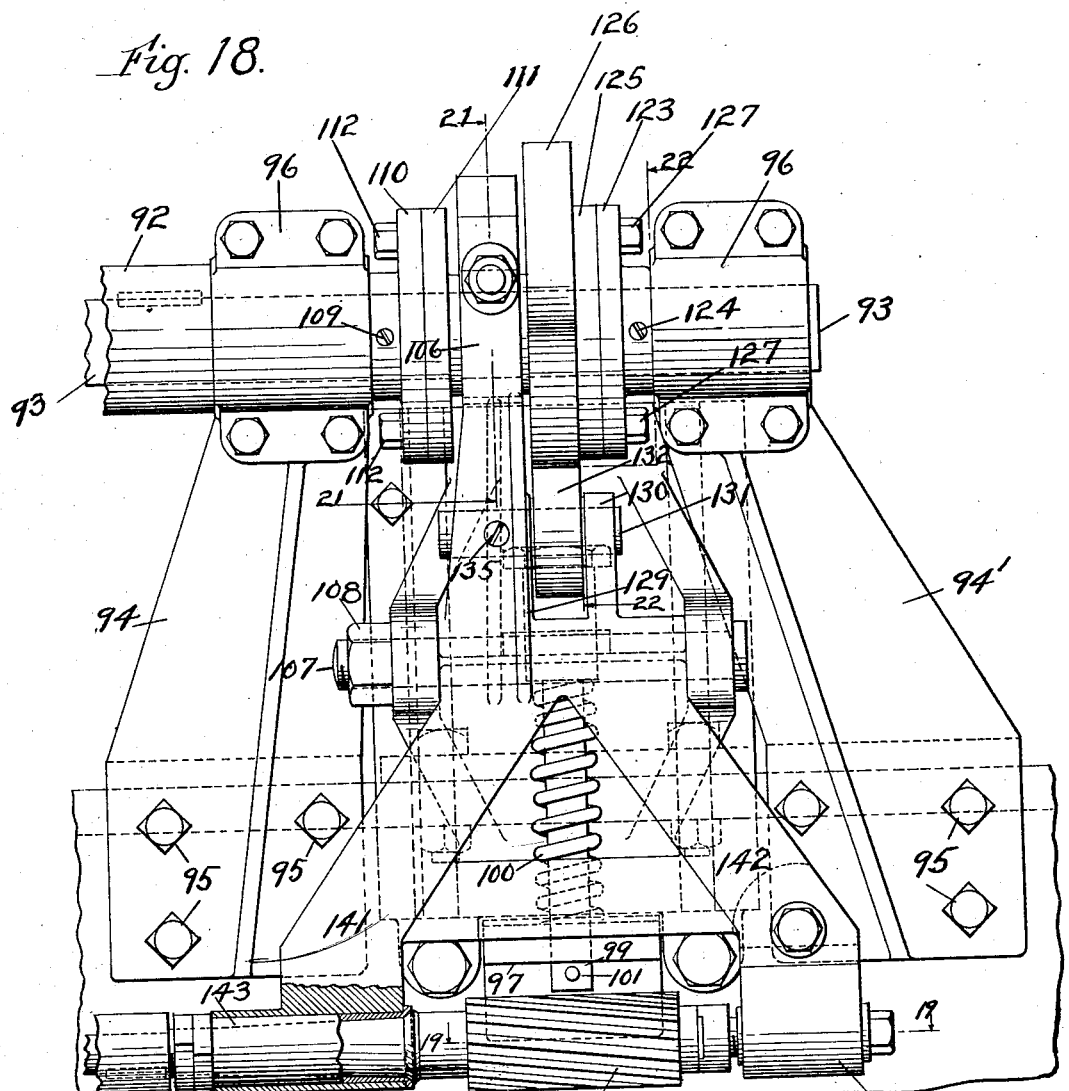

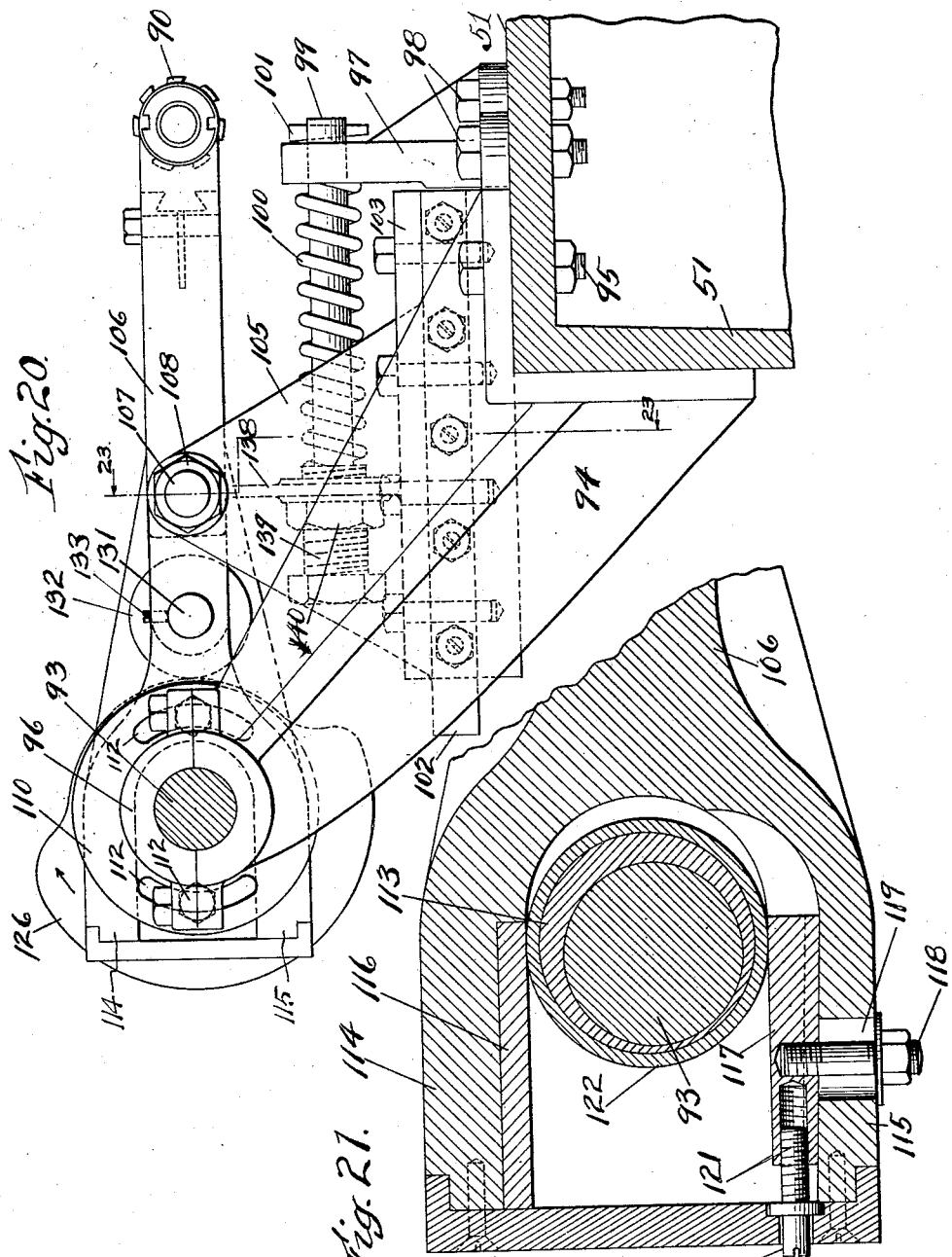

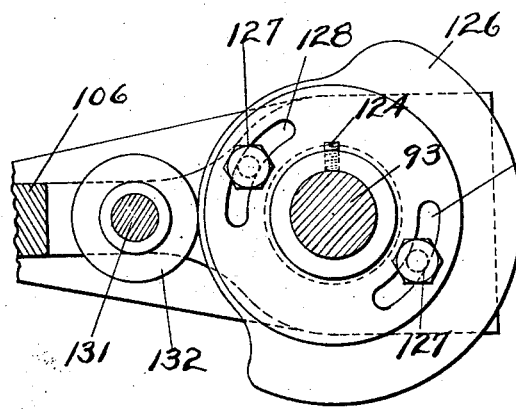
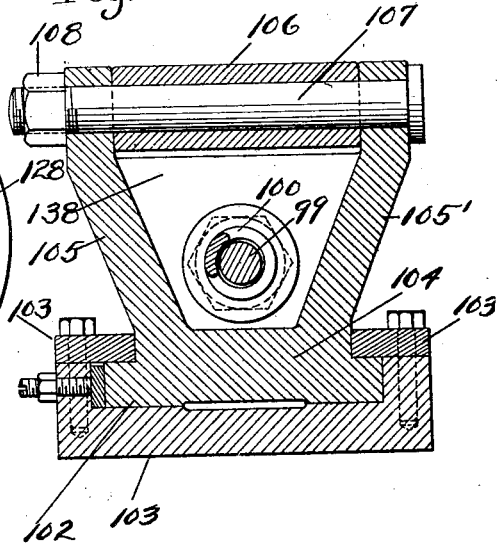
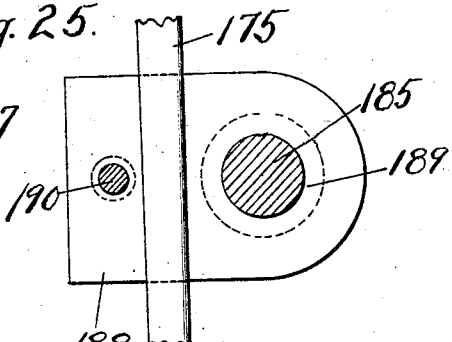
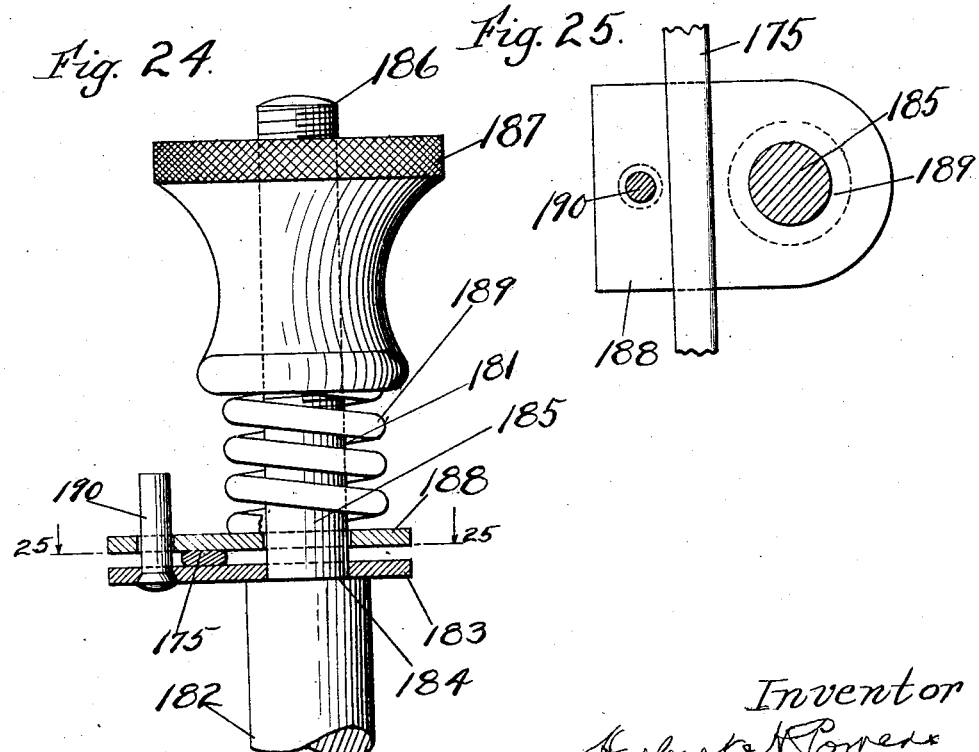

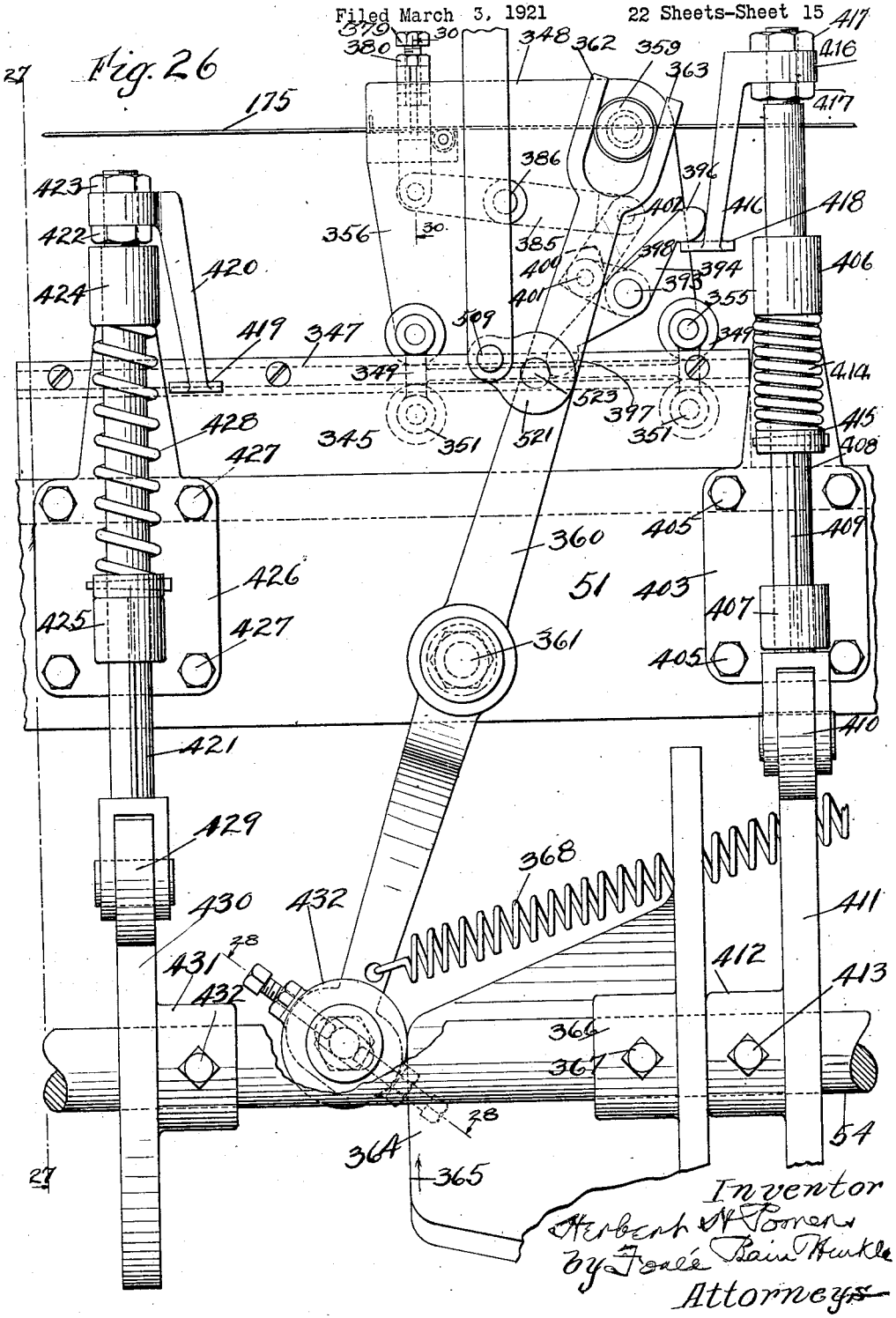

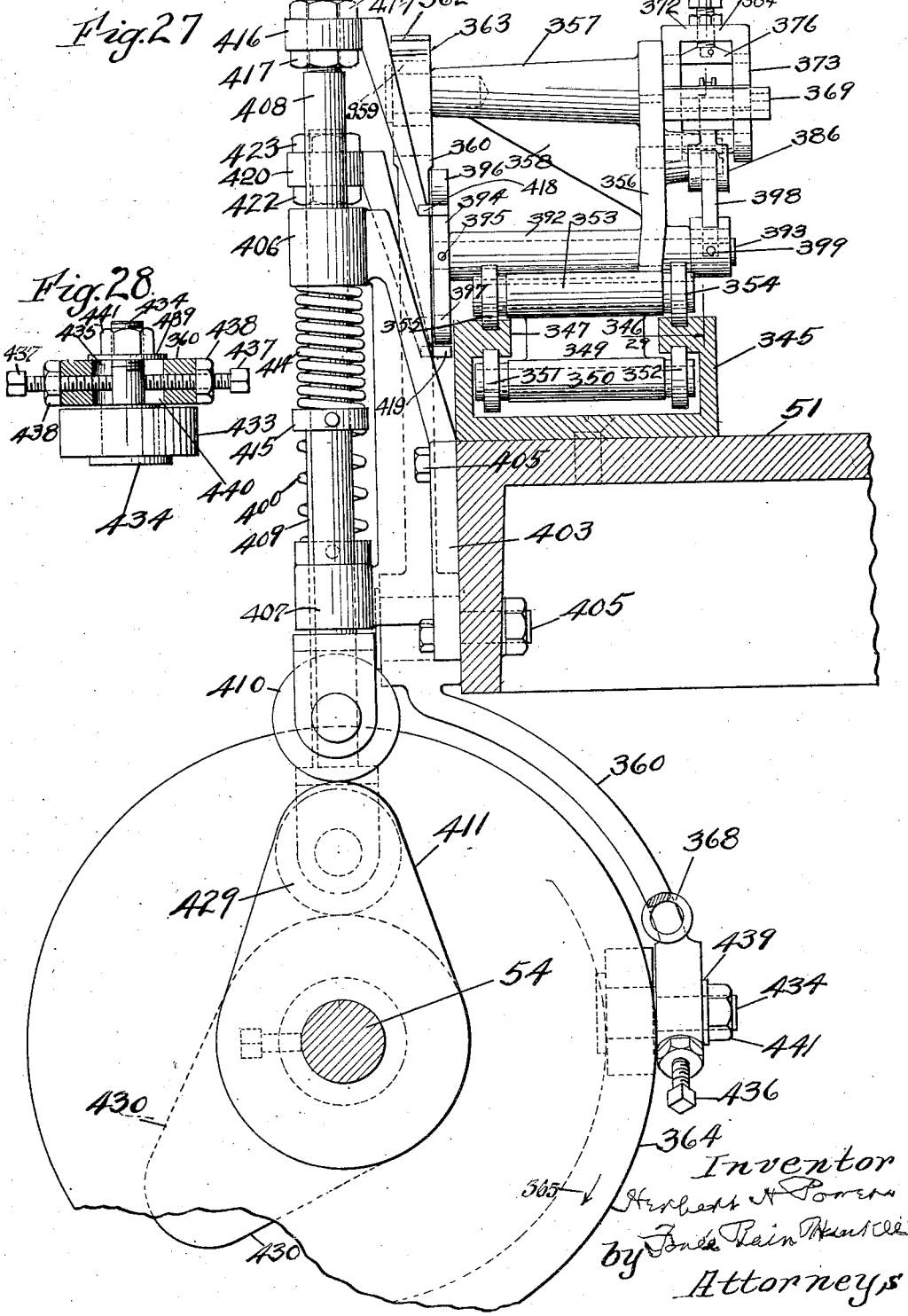

Oct. 25, 1927.  
H. H. POWERS  
1,646,870  
METHOD OF AND MACHINE FOR MAKING SAWS  
Filed March 3, 1921 22 Sheets-Sheet 17
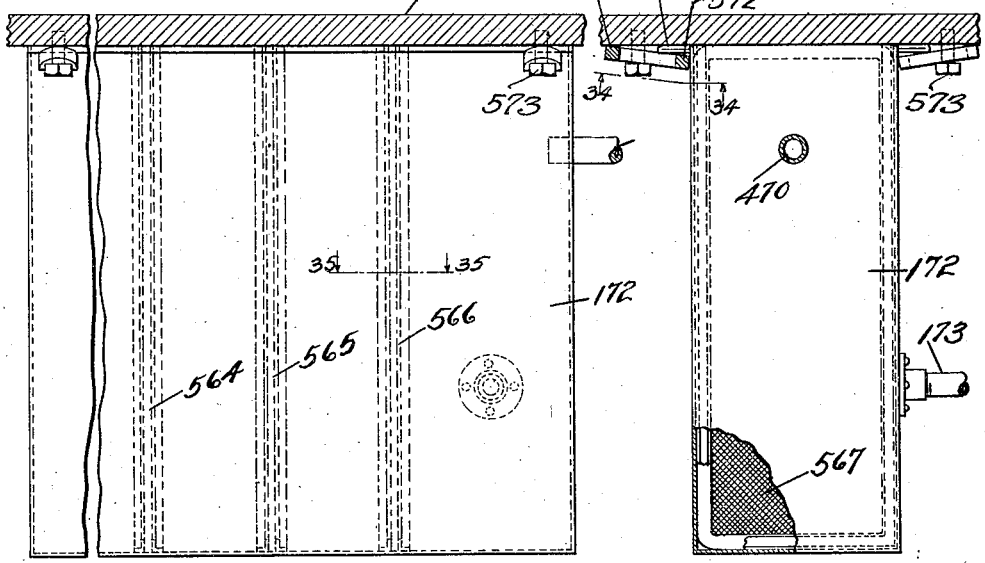
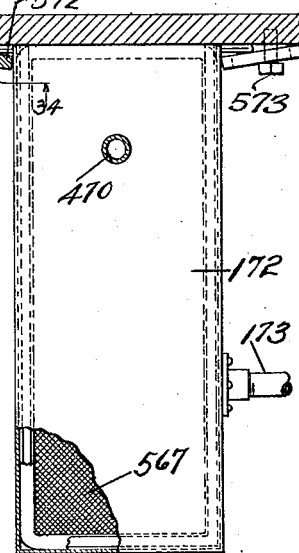
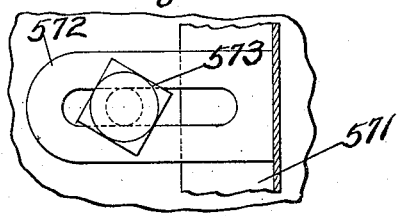
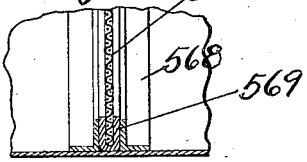
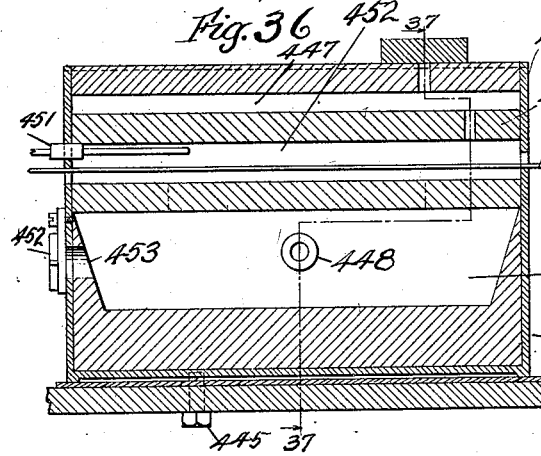
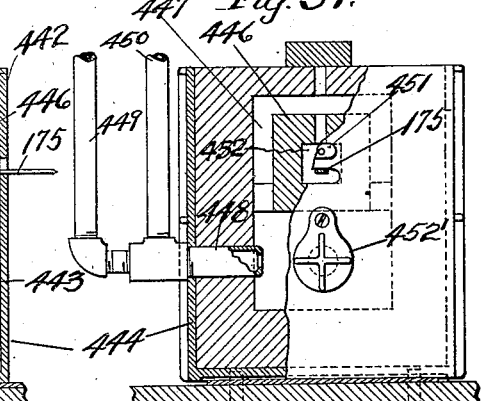

Oct. 25, 1927. 1,646,870
H. H. POWERS
METHOD OF AND MACHINE FOR MAKING SAWS
Filed March 3, 1921 22 Sheets-Sheet 18
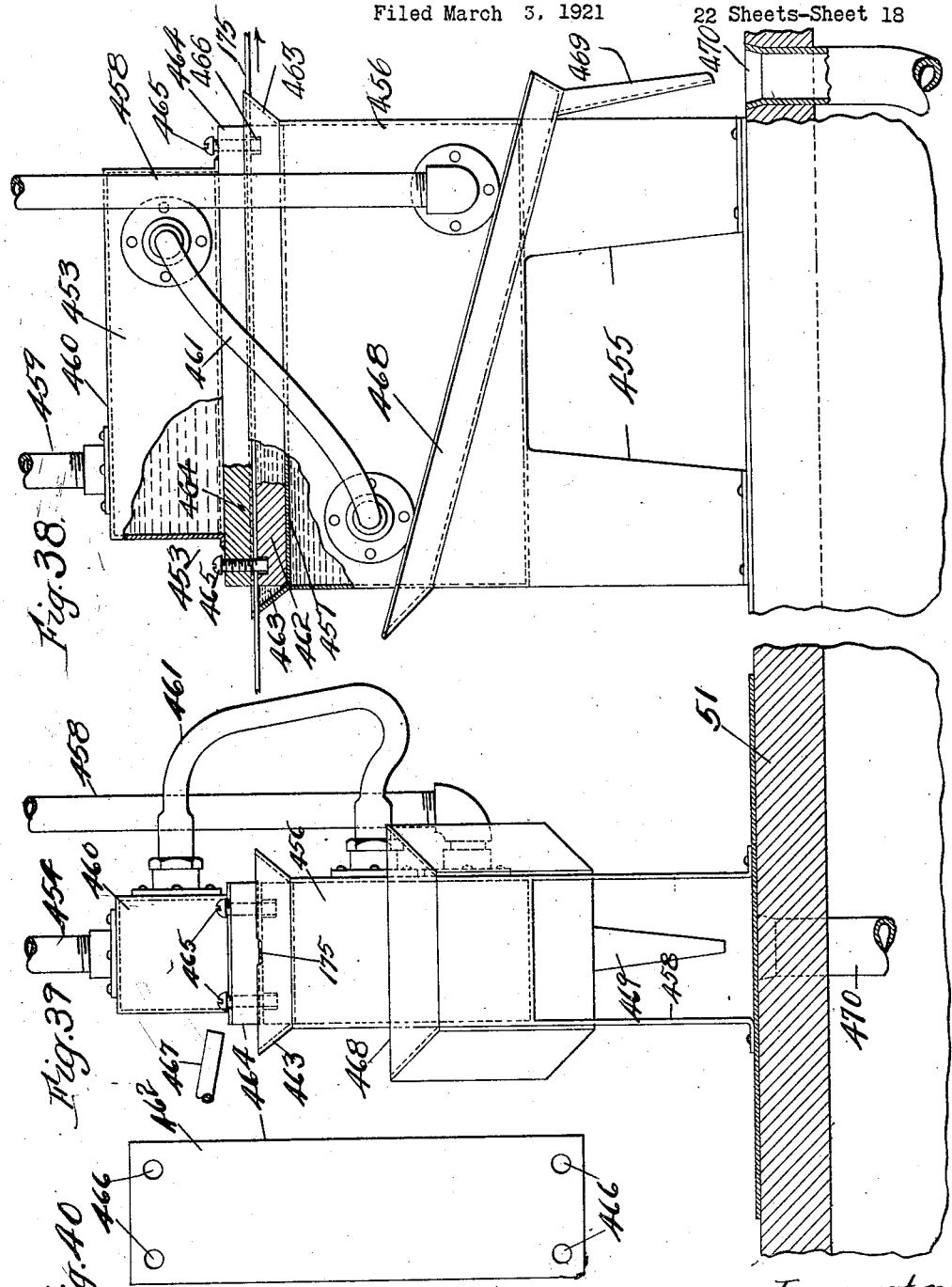
Inventor
Herbert H Powers
By Bond Bain Nichle
Attorneys

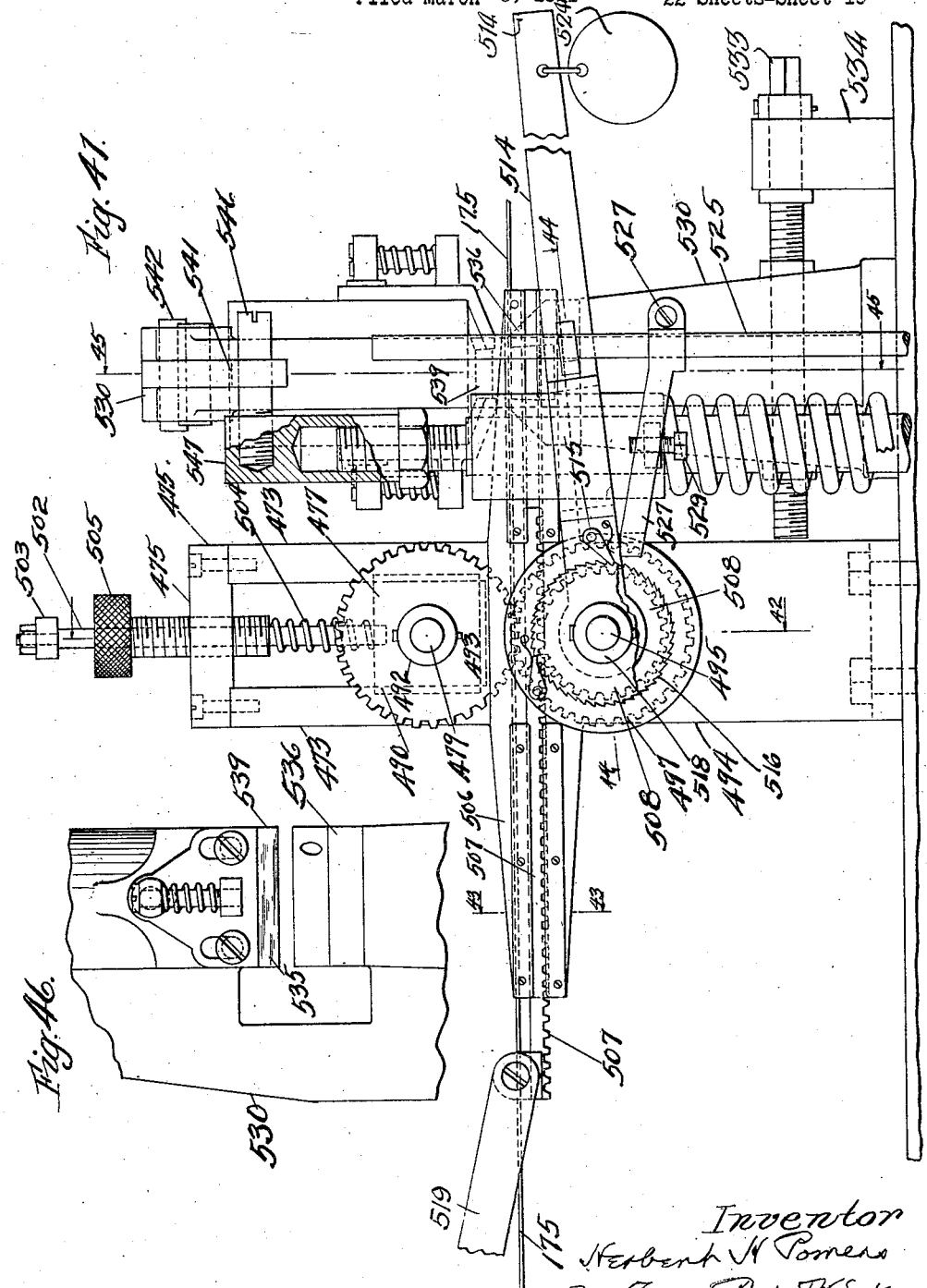

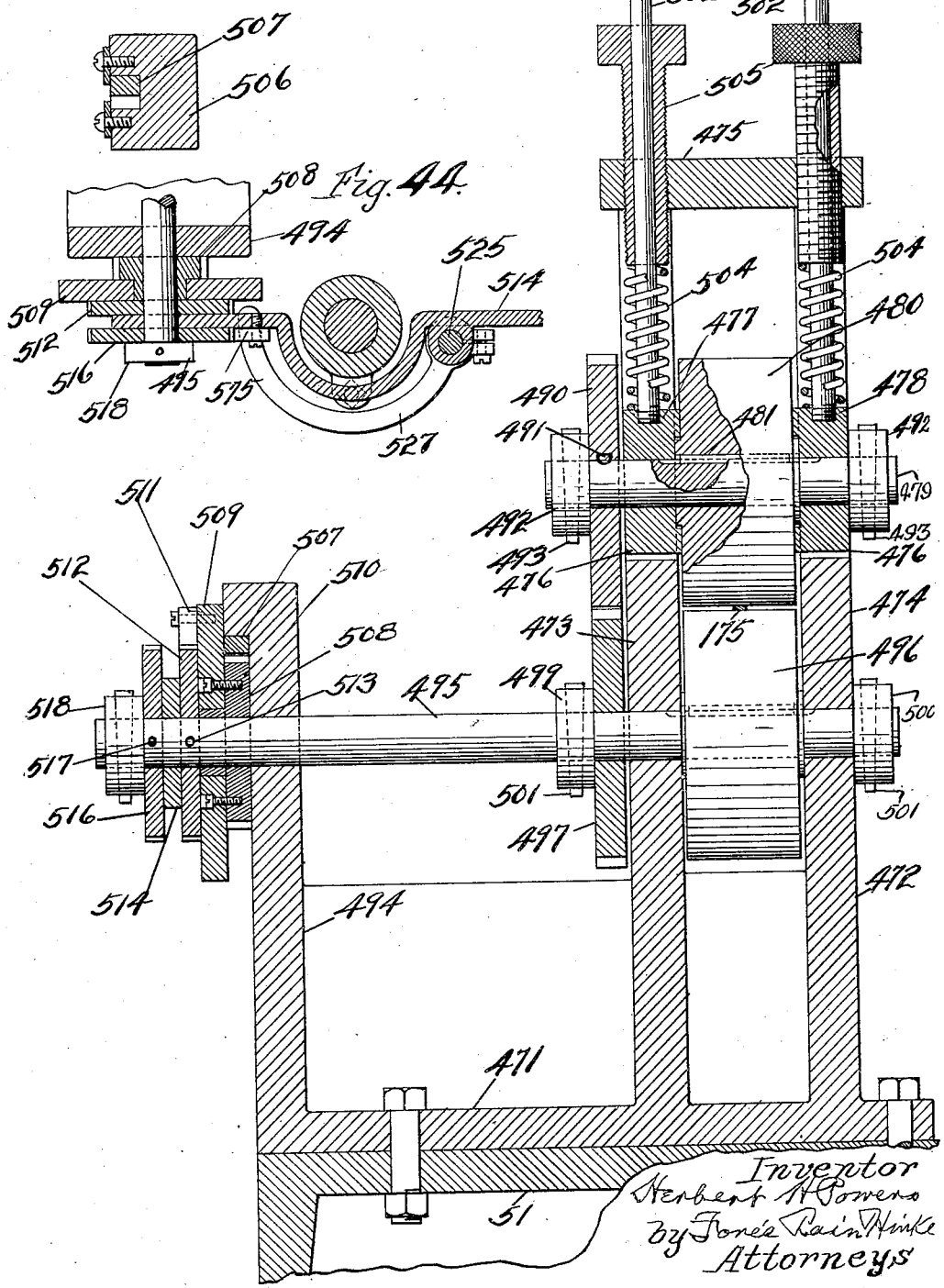

Oct. 25, 1927.  
H. H. POWERS  
1,646,870  
METHOD OF AND MACHINE FOR MAKING SAWS  
Filed March 3, 1921 22 Sheets-Sheet 21

Inventor  
Herbert H. Powers  
by Foree Bain Hinkle  
Attorneys

Oct. 25, 1927.
H. H. POWERS
1,646,870
METHOD OF AND MACHINE FOR MAKING SAWS
Filed March 3, 1921     22 Sheets-Sheet 22
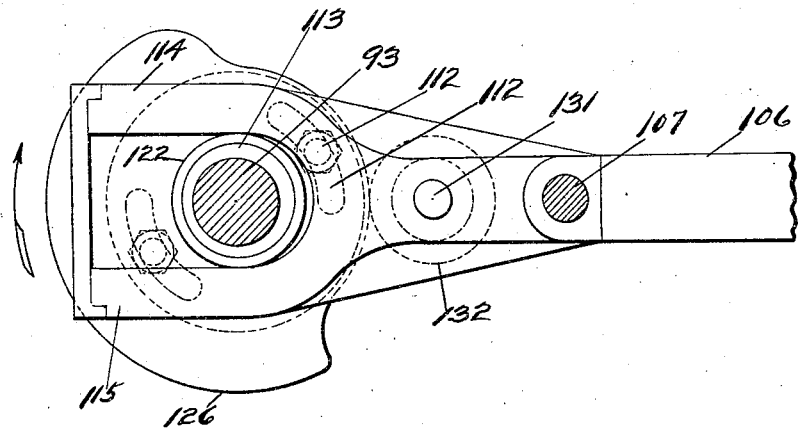
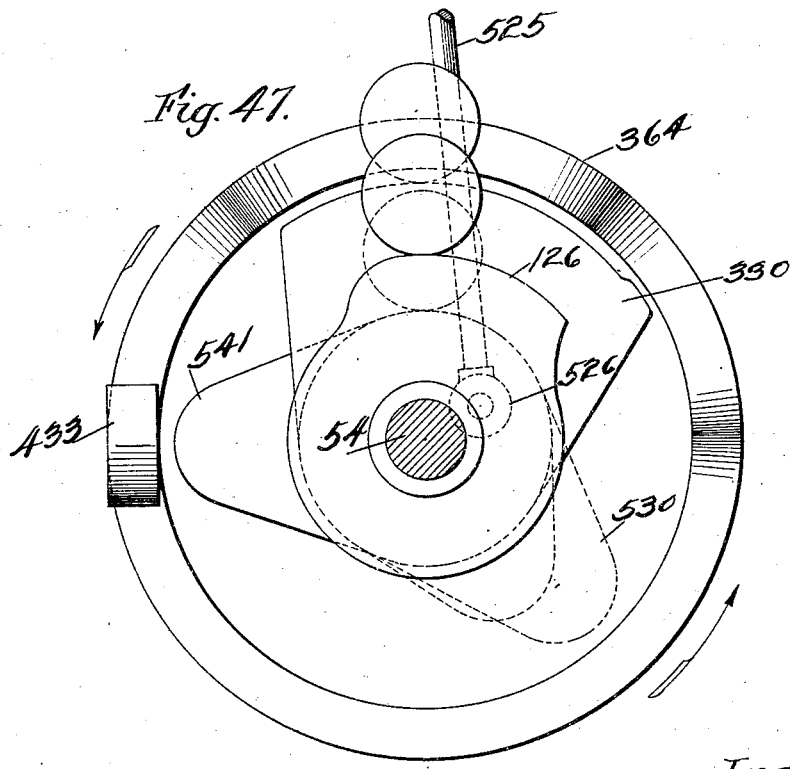

Patented Oct. 25, 1927.

1,646,870

UNITED STATES PATENT OFFICE.

HERBERT H. POWERS, OF LA GRANGE, ILLINOIS.

METHOD OF AND MACHINE FOR MAKING SAWS.

Application filed March 3, 1921. Serial No. 449,426.

The invention relates to improvements in a method of and machine for making saws.

One of the objects of the invention is to provide a method of making saws and a machine for carrying the method into effect, which is automatic in operation; which will, after being properly adjusted, continue to make saws successively without manual supervision; which will make saws from reels of wire or ribbon and successively perform all of the necessary operations thereon in substantially continuous order, without materially stopping the progress of the wire or strand through the machine; in which all of the operations necessary for the completion of one saw are in progress on as many other saws at one time, so that as a given part of the wire strand, to subsequently constitute one saw, is moved forward in the machine, the operations will be performed thereon in suitable sequential order.

Another object is to mill all of the teeth of a saw by one pass of the milling cutter, and to slightly increase the depth of the cut to finish the operation.

Another object is to provide a backing for each tooth to be cut, to prevent formation of burs on the trailing edges of the teeth.

Another object is to provide a machine capable of making fret saws and the finest grades of jewelers' saws in some of which the teeth, though substantially perfect, are almost invisible to the unaided eye.

Other, further and more specific objects of the invention will become readily apparent, to persons skilled in the art, from a consideration of the following description, when taken in conjunction with the accompanying drawings, wherein:—

Fig. 10 is a section taken on line 10—10 of Figs. 6 and 8.

Fig. 11 is a section taken on line 11—11 of Fig. 6.

Fig. 12 is an enlarged section taken on line 12—12 of Fig. 8.

Fig. 13 is an enlarged section taken on line 13—13 of Fig. 8.

Fig. 14 is a section taken on line 14—14 of Fig. 13.

Fig. 15 is an enlarged detailed side elevation of one of the wire holding arms showing parts in section.

Fig. 16 is a plan view of the arm, shown in Fig. 15, and connecting parts.

Fig. 17 is an enlarged section taken on line 17—17 of Fig. 1.

Fig. 18 is an enlarged detailed plan view of the milling cutter and cutter operating mechanism.

Fig. 19 is an enlarged section taken on line 19—19 of Fig. 18.

Fig. 20 is a side elevation of Fig. 18.

Fig. 21 is an enlarged section taken on line 21—21 of Fig. 18.

Fig. 22 is a section taken on line 22—22 of Fig. 18.

Fig. 23 is a section taken on line 23—23 of Fig. 20.

Fig. 24 is a detail of the wire tensioning device.

Fig. 25 is a transverse section taken on line 25—25 of Fig. 24.

Fig. 26 is an enlarged view of a front elevation of the wire moving carriage.

Fig. 27 is an enlarged section taken on line 27—27 of Fig. 26.

Fig. 28 is a section taken on line 28—28 of Fig. 26.

Fig. 29 is a section taken on line 29—29 of Fig. 27.

Fig. 30 is a section taken on line 30—30 of Fig. 26.

Fig. 31 is a section taken on line 31—31 of Fig. 29.

Fig. 32 is a side elevation of a tank for containing the circulating oil.

Fig. 33 is an end elevation of said tank showing parts in section.

Fig. 34 is a detailed section taken on line 34—34 of Fig. 33.

Fig. 35 is a section taken on line 35—35 of Fig. 32.

Fig. 36 is a longitudinal section thru the furnace for heating the saw.

Fig. 37 is a transverse section taken on line 37—37 of Fig. 36.

Fig. 38 is a side elevation of the tempering plate partly in section.

Fig. 39 is an end elevation of the hardening plate.

Fig. 40 is a plan of the bottom hardening plate showing the holes.

Fig. 41 is a front elevation of the take-up rolls and wire cutters.

Fig. 42 is a section taken on line 42—42 of Fig. 41.

Fig. 43 is a section taken on line 43—43 of Fig. 41.

Fig. 44 is a section taken on line 44—44 of Fig. 41.

Fig. 46 is a detailed side elevation of the wire cutting jaws.

Fig. 47 shows diagrammatically the position of the cams on the lower shafts with the vise jaws open and the wire about to be pulled thru.

Fig. 48 is a section thru the upper cam shaft with the cam in position corresponding to Fig. 47, the cutter having been withdrawn from the wire.

In all the views the same reference characters refer always to the same parts.

Figure 1:
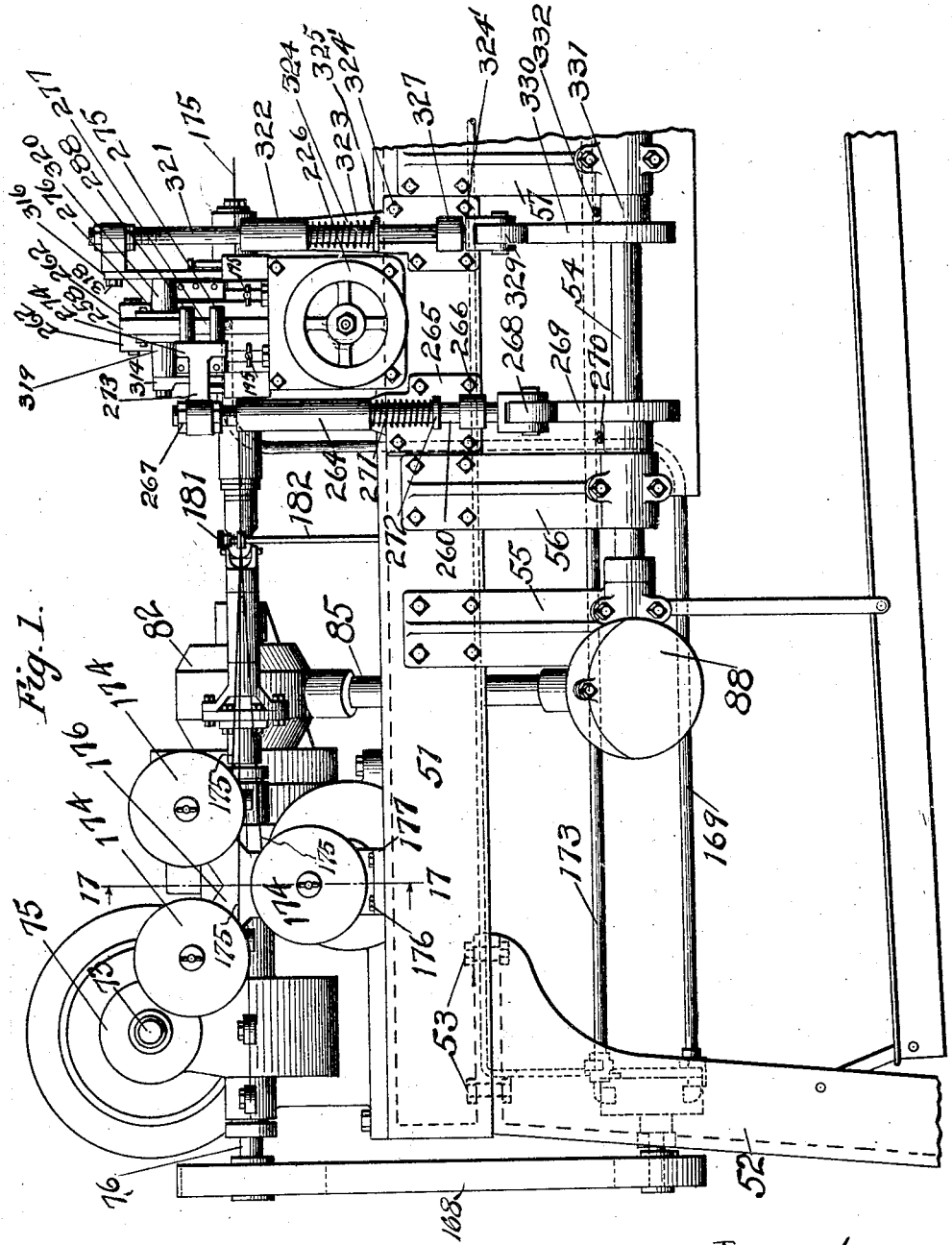
Fig. 1 is a side elevation of the left, or power end of the machine.

In the embodiment shown in the drawings the frame upon which the machine is built consists of an inverted channel beam 51 and legs 52, one at each end, supporting the beam and bolted thereto by bolts 53. A main cam shaft 54, substantially parallel with the frame 51, is supported therebelow by the means of bearing hangers 55, 56, 57, 58 and 59. Each of the hangers is provided at its lower end with a removable bearing cap 60 held by studs 61 that are secured in place by nuts 62, so that the shaft may be removed at any time from its bearings.

A bracket 63 (Fig. 5) is fixed to the frame beam 51 by bolts 64, and upon the outer end of the bracket is mounted, on the power end of the machine, an electric motor 65, as by bolts 66, for driving the machine.

A speed controlling rheostat 67 is secured to the bracket 63 upon braces 68 and is located out of the region where it is liable to become contaminated with grease, dirt, and the like.

The rheostat is controlled by a bar of wood 69 which is secured to the controlling lever 70, as at 71, and which extends along the machine to the finishing end thereof and is loosely supported in a bracket 72 near its terminal end, so that the speed of the machine may readily be controlled from any point along its length. This is especially advantageous when threading the machine and starting it into operation, as then it is more conveniently performed when the operator is standing at or near the finishing end of the machine.

The motor shaft 73 is connected by a flexible coupling 74 to a spiral gear (not shown) within the housing 75, and by means of another spiral gear (not shown) in the said housing, the shaft 73 is connected to the shaft 76 in a five to one ratio.

The shaft 76 extends thru bearings 77 and 78 and the housing 79 and terminates in a flexible coupling member 80. Another shaft 76', substantially parallel with the motor shaft 73 and at right angles with the shaft 76, is connected to the latter by spiral gear (not shown) and extends thru the housing 81 of the gearing head 82. Connected to the transverse shaft 76', that extends thru the housings 79 and 81, is another transverse shaft 81' located in the bearings 83 and 84, which is connected by a miter gear (not shown) to a shaft 85 that is downwardly inclined thru the bed 51 of the machine, and another shaft 86 is connected in like manner to the shaft 76' that is located in the housings 79 and 81, this shaft terminating in a universal joint member 87. The downwardly inclined shaft 85 terminates in a housing 88 in which is contained a bevel gear train (not shown) for driving the cam shaft 54.

*The milling cutter and means for driving it.*

The means for driving the cutter 90 is connected to the shaft 86 by the tumble shaft 91, having universal joint members at each of its ends for connection with the universal joint members 87 and 92, the latter being fixed to the end of the shaft 93. The cutter 90, besides its rotary motion has four other motions; it is moved downwardly and, during the cutting operation, it is moved rearwardly, then upwardly, and then forwardly, completing its cycle of operation. It is moved upwardly during the interim between its cutting operations to clear the saw strip or strand as it is pulled past the cutter after the completion of each full cycle of the machine.

Mounted on the frame 51 of the machine are two brackets 94 and 94', secured thereto by cap screws or bolts 95, and having on their respective outer ends bearings 96—96' for the shaft 93.

A standard 97 (Fig. 20) is fixed to the bed 51 by bolts 98 to support a horizontal rod 99 that passes therethrough and is held against the thrust of the spring 100 by the transverse pin 101.

A sliding structure 102, more clearly shown in Fig. 23, is horizontally movable, transversely of the machine, in the guide 103. Rising from the base 104 of the sliding structure are two vertically diverging brackets 105—105', joined by a web. Between these brackets is an arm 106 carrying the cutting tool 90 and which is pivoted on the bolt 107, held therein by the nut 108.

Fixed to the shaft 93 by the screw 109 is a circumferentially slotted flange 110. Another flange 111 is circumferentially adjusted, with respect to the flange 110, by means of the slots referred to and the cap screws 112. The flange 111 carries an eccentric 113 which neatly fits the shaft 93, and which is more clearly shown in Fig. 21. The rear end of the arm 106 is bifurcated into two arms 114 and 115, between which is the shaft 93 and eccentric 113. A hardened ground plate 116 is secured to the inner surface of the arm 114 and a similar plate, or wedge 117, is longitudinally adjustable by the screw 118 in the slot 119 and the screw 120 which is threaded in the end of the wedge 117, as at 121, to compensate for wear. A hardened ring 122 neatly fits between the plates 116 and 117 and overlies eccentric 113.

Now, from the foregoing description, it will be evident that when the shaft 93 is rotated the front end of the arm 106 is moved, alternately, up and down in a substantially vertical direction and, it is furthermore apparent, that the arm 106, in virtue of the structure shown in Fig. 21, is permitted to be axially moved with reference to eccentric 113, by the following described means.

A flange 123 (Fig. 18) is secured to the shaft 93 by a set screw 124. Another flange 125 bearing an eccentric 126 is circumferentially adjusted, with reference to flange 123, by means of slots 128 in the flange 123 and the cap screws 127. The cap screws pass thru the slots 128, more clearly shown in Fig. 22. The flanges 110 and 111 are adjustable in the same manner for shifting the eccentrics, to change time of operation.

Projecting from the lever 106 near its pivot point are spaced apart arms 129 and 130, thru which pass a pin 131 that carries a roller 132, the pin 131 being fixed by the set screw 133. The roller 132 is held in yielding contact with the cam 126 by the spring 100, the spring being the means for moving the cutter tool 90 rearwardly when permitted by the cam 126 and the cam being the means for positively moving the cutter forwardly by its contact with the roller 132. The excentricity of the cam is such as to slightly increase the depth of the cut in the saw just before the operation is finished to produce a sharpening or in effect a "finishing cut".

From the foregoing description it will be observed that the excentric 113 and the cam 126 are the means by which the cutting tool is given its four motions, in addition to its rotary motion.

The arms 105—105' of the sliding member 102 are joined together by a web 138 which serves as an abutment for the spring 100 that surrounds the rod 99, and which is the active means for the return movement of the cutter 90 from the saw blade.

The inner end of the rod 99 (Fig. 20) projects into the end of the screw 139 which is axially adjustable in the web 138 and against which the inner end of the spring 100 bears. The screw 139 is a means by which the tension of the spring 100 may be adjusted which is subsequently fixed in adjusted position by means of the nut 140.

The arm 106 is bifurcated at its front end into two arms 141 and 142 each of which carries a hollow hub, 143 and 144, respectively. The milling cutter 90 is hollow and each of its open ends is ground true to a taper, as at 145 and 146. A shaft 147 which drives the cutter is reduced in section at 148 and is provided with a tapering shoulder 149 for cooperation with the tapered end 145 of the cutter. The outer end 150 of the shaft is threaded and upon the reduced end is a nut 151 having a tapered shoulder 152 for engagement with the tapered end 146 of the cutter. The cone 151 is adjustably held in contact with the adjacent end of the cutter 90 by a check nut 153. The terminal end 154 of the shaft 147 is received in the bearing boss 144 which is tapered and which contains an axially movable bearing member 155, split as at 156, into three parts, thus slightly collapsible in the tapered socket in the bearing 144 in which it is received, by the screw 157, which is threaded in the end, as at 158, the object of which is to prevent any end lateral or axial lost motion of the shaft 147, by contact of the end 159 with the end 154 of the shaft and by collapsing the bearing member 155 in which the end 154 is contained.

Figure 3:
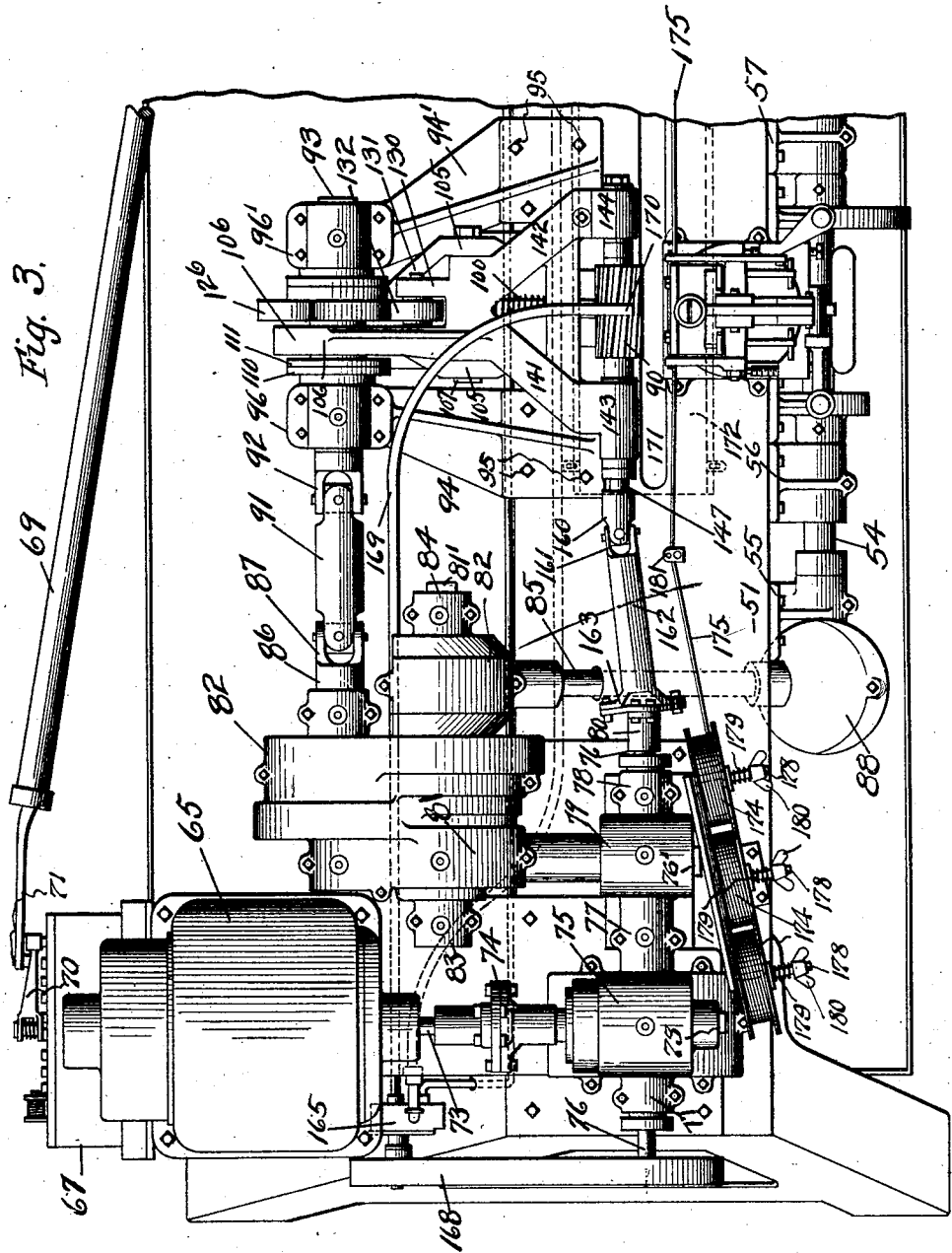
Fig. 3 is a plan view of the power end of the machine, shown in elevation in Fig. 1.
Figure 4:
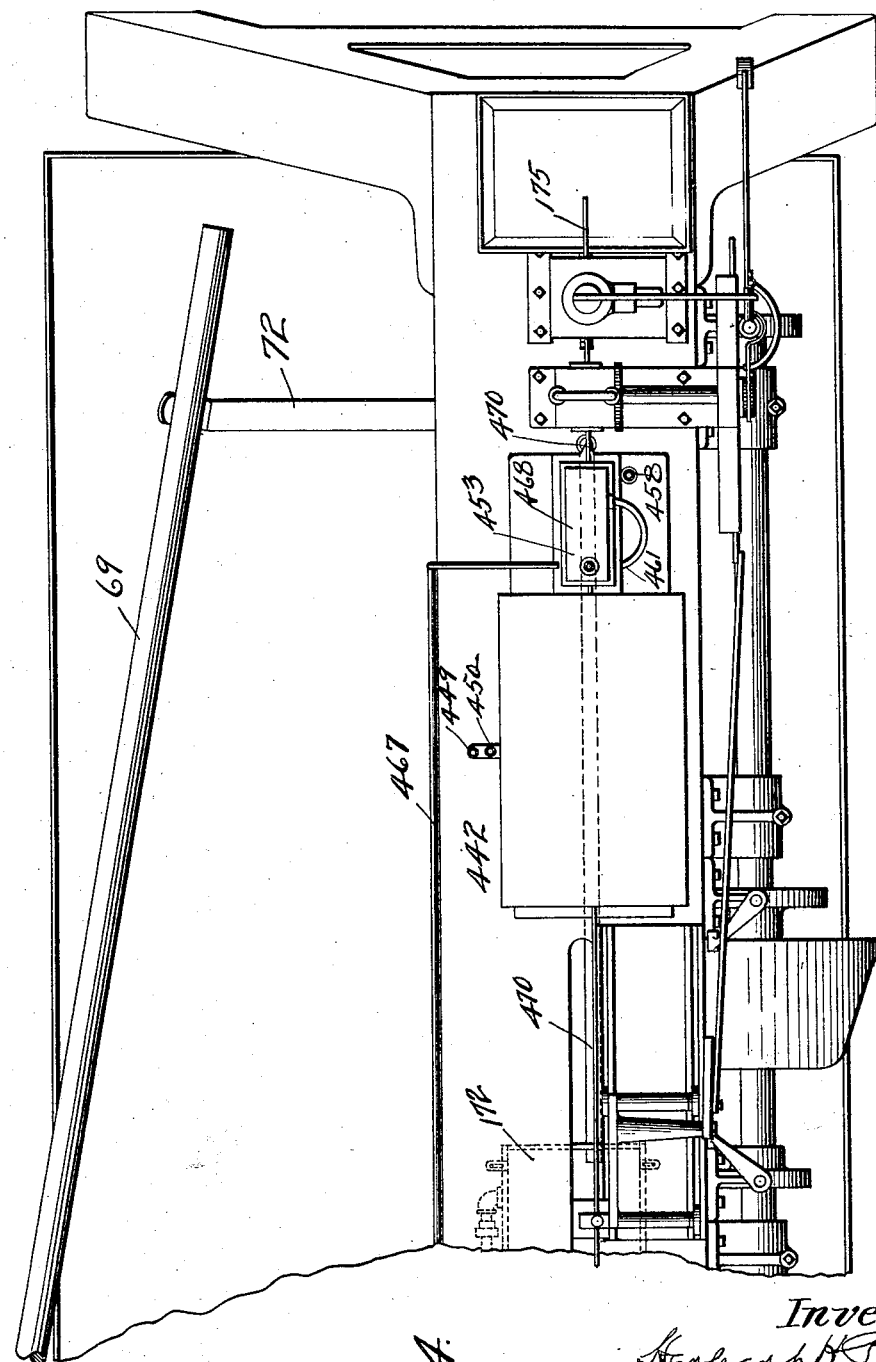
Fig. 4 is a plan view of the finishing end of the machine, shown in elevation in Fig. 2.

By supporting the cutting tool or miller 90 only at its ends, as shown and described, it is more accurately positioned in the event of warping or other deformation by tempering. Upon the ends of the shaft 147 (Fig. 3) is a universal joint member 160 connected to a similar member 161 on the end of the tumble shaft 162. The shafts 76 and 147 are out of alignment when the cutter 90 is not in operative position, but when it is moved forwardly into position for milling the teeth in the saw, the two shafts are practically in axial alignment.

Tumble shaft 162 carries a flexible member 163 which is connected to a similar member 80 on the shaft 76. By this means the cutter is driven.

Oil pump and means for driving it.

On the outboard end of the shaft 76 (Figs. 3 and 5) is fixed a pulley 164 for driving the oil pump 165, the latter having a pulley 166 on its shaft 167, and a belt 168 being the means by which the oil pump is shown to be driven. Leading from the oil pump is a pipe 169 that terminates at 170 over the cutter 90.

The bed or frame 51 of the machine is provided with a slot 171 thru which the oil passes from the end 170 of the pipe 169 after passing over the surface of the cutter 90. The oil passes thru the slot 171 and is received in the tank 172 and from thence returns to the pump 165 thru the pipe 173.

From the foregoing description it will be clearly understood just how the cutting miller 90 is lubricated and operated in cutting the teeth in the saw.

The saws are best made of high carbon annealed steel, preferably wire, rolled flat in proportion that the width of the saw made therefrom will be twice as great as its thickness. The wire or strand is held in an especially constructed vise, provided with removable annealed tool steel jaws, which may easily be replaced when worn out.

When the teeth are cut in the first saw, they are also cut simultaneously in annealed jaws of the vise, the depth of the teeth being the same as in the saw, so that while the teeth are being cut in the saw each tooth is completely supported or backed up, so to speak, by a renewable jaw of the vise.

After the teeth have been cut successively in a number of saws the adjustable jaw is moved up to compensate for the cut-away portion necessitated by operation upon the saws.

The wire or strand of which the saws are to be made is contained upon spools 174 that are mounted upon a frame 176 supported near the power end of the machine. Only one wire 175 is shown to be sent thru the machine at one time and only one saw is made at each operative pass of the cutter 90. It is clearly apparent, however, that a plurality of saws may be cut at one operation of the cutter. The frame 176 that supports the spool 174 is secured to the base of the machine 51 by screws 177. From the vertical portion of the frame 176 extend studs 178, upon which the spools 174 are rotatably supported. Springs 179 bear against the face of the spools and against wing nuts 180 that are adjustable upon the stems or studs 178. By this means tension is given to the spools to prevent unnecessary rotation. A plurality of spools are thus placed near the point of use so as to be more conveniently available when they are required. The outer end of each spool of wire is carried to a common tensioning device 181 and when it is desirable to send only one strand thru the machine where they are left with the exception that the wire from one of the spools only may be carried thru the machine and operated upon, the others not being used, until the first spool has been exhausted, after which another wire from the tensioning device is carried thru the machine, and so on, in reasonably rapid succession.

Tension device.

The tensioning device 181 (Fig. 24) is located on the upper end of the post 182 to elevate it to the proper horizontal position to guide the strand thru the vise by which it is held when the teeth are being cut. The tensioning device consists of plate 183 that rests upon a shoulder 184 of the post 182. At the shoulder 184 the post is reduced in diameter, as at 185, and threaded on its upper end, as at 186, is a thumb screw 187. Another plate 188 is superposed above the plate 183 and between these plates the wire or strand 175 is yieldingly held by a spring 189. A pin 190 is secured to the lower plate 183 and passes freely thru the upper plate 188, to prevent relative rotation of the plates.

Three or four strands 175 may easily be contained between these tensioning plates and as the strands or wires are accurately of the same thickness the tensioning effect will be equally distributed therebetween. The tension applied to the strands 175 by the device 181 when the strand is periodically moved after completion of each saw, serves to hold the strand taut, or sufficiently so, for the purpose.

Strand holding vise.

When the strand is milled or cut to provide teeth for producing the saw, it must be firmly and accurately held in the vise during the cutting operation, and this vise must be very accurately and positively adjustable for presentation of the saw to the milling cutter.

Figure 9:
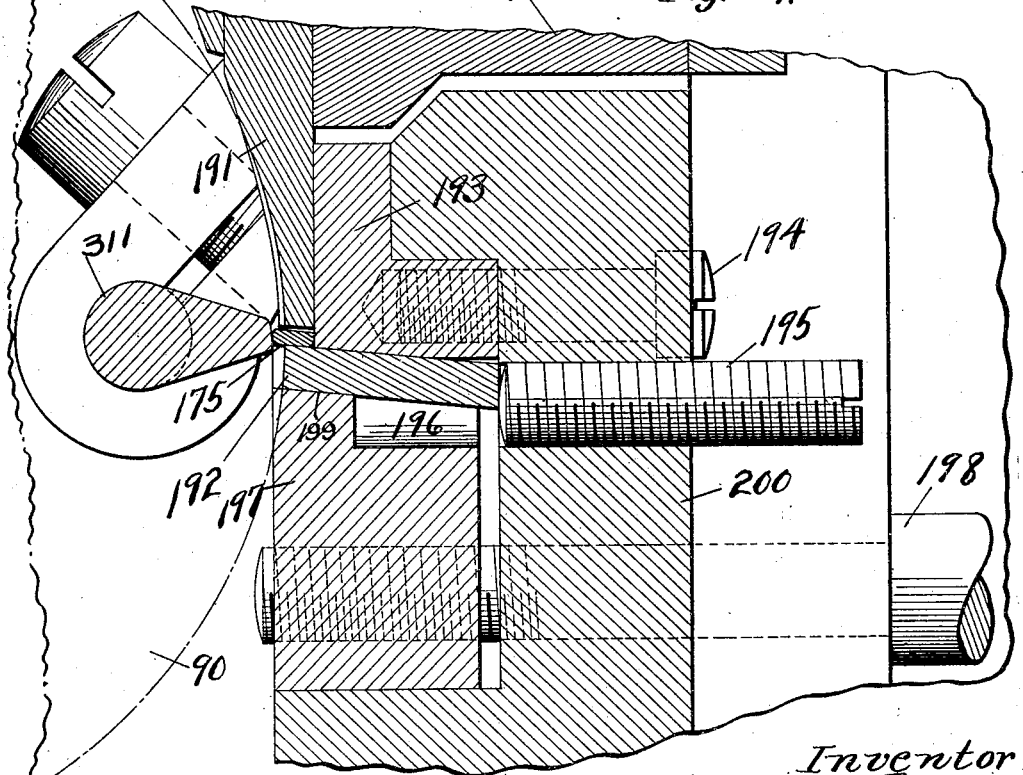
Fig. 9 is an enlarged section taken on line 9—9 of Fig. 8.

Fig. 9 shows an enlarged cross sectional view of the vise jaws or holding members of the vise. 191 is the vertically movable member between which and the stationary but adjustable member 192 the saw strand 175 is firmly held. These jaws are subject to wear or disintegration by operation of the milling cutter and are made of annealed tool steel and are readily replaceable when worn out.

A backing plate 193, of tempered hardened steel, lies immediately back of the jaw 191 and immediately above the jaw 192, is held in place by a screw 194. The jaw 192 is adjustably moved forward by a screw 195 to compensate for wear. The screw 195 will enter the aperture 196 to move the jaw 192 as far in a forward direction towards the cutting tool 90 as may be. The jaw 192 may be removed by backing out the clamping member 197 from its position, shown in Fig. 9, by operation of the screws 198. The upper surface of the member 197 is tapered, as at 199, so as to clamp the jaw 192 firmly in place when the member 197 is drawn into position towards the relatively stationary member 200.

The stationary member 200 includes a standard provided with a rearwardly extending rib 201 (Fig. 10) and laterally projecting guideways 202 and 203 for a slide 204, that is movable vertically and carries the movable jaw 191 of the vise. The base part 205, of the member 200 (Fig. 6), is circular in plan and is tapered as at 206, which taper fits into a tapered depression 207 that is made in the slidable structure 208. The tapers 206—207 are made on the member 205 to accurately center the member when it is drawn in tight engagement with the member 208 with the screw 209.

Fig. 11: A circular hub 210 is a part of the member 205 which projects downwardly into a cylindrical cavity 211 made in the member 208, and serves to hold the superposed member vertically. The tapered disk 206 is cut away on opposite sides (Fig. 11) to provide shoulders 213 and 214 against which the adjusting screws 215 and 216 are normally in contact. These screws pass thru threaded hubs 217 and 218 provided on the relatively stationary member 208. The screws 209 pass thru slots 219 made thru the tapered disk. Now, as the member 200 carries both of the jaws of the vise, it is essential that the front edge of the back plate 193 shall be strictly and accurately in axial alignment with the axis of the milling cutter 90. This can adjustably be accomplished by rotating the member 200 by use of the screws 215 or 216 in and out as the case may be, until the parallelism sought has been effected; thereupon the screws 209 are tightened in the slots 219.

To adjust the vise and the saw strand contained therein with respect to the cutter 90, the member 208 is made slidable upon the fixed member 220.

The fixed member 220 has laterally projecting lugs 221 thru which pass cap screws 222 into the bed member 51. The fixed member 220 has a longitudinally extending recess or opening 223 into which projects a threaded lug 224 of the member 208. A screw 225 passes thru the lug and is rotatable by the hand wheel 226. The screw also passes thru a part 227 on the member 220 and is held from axial movement by the collars 228 and 229.

Figure 7:
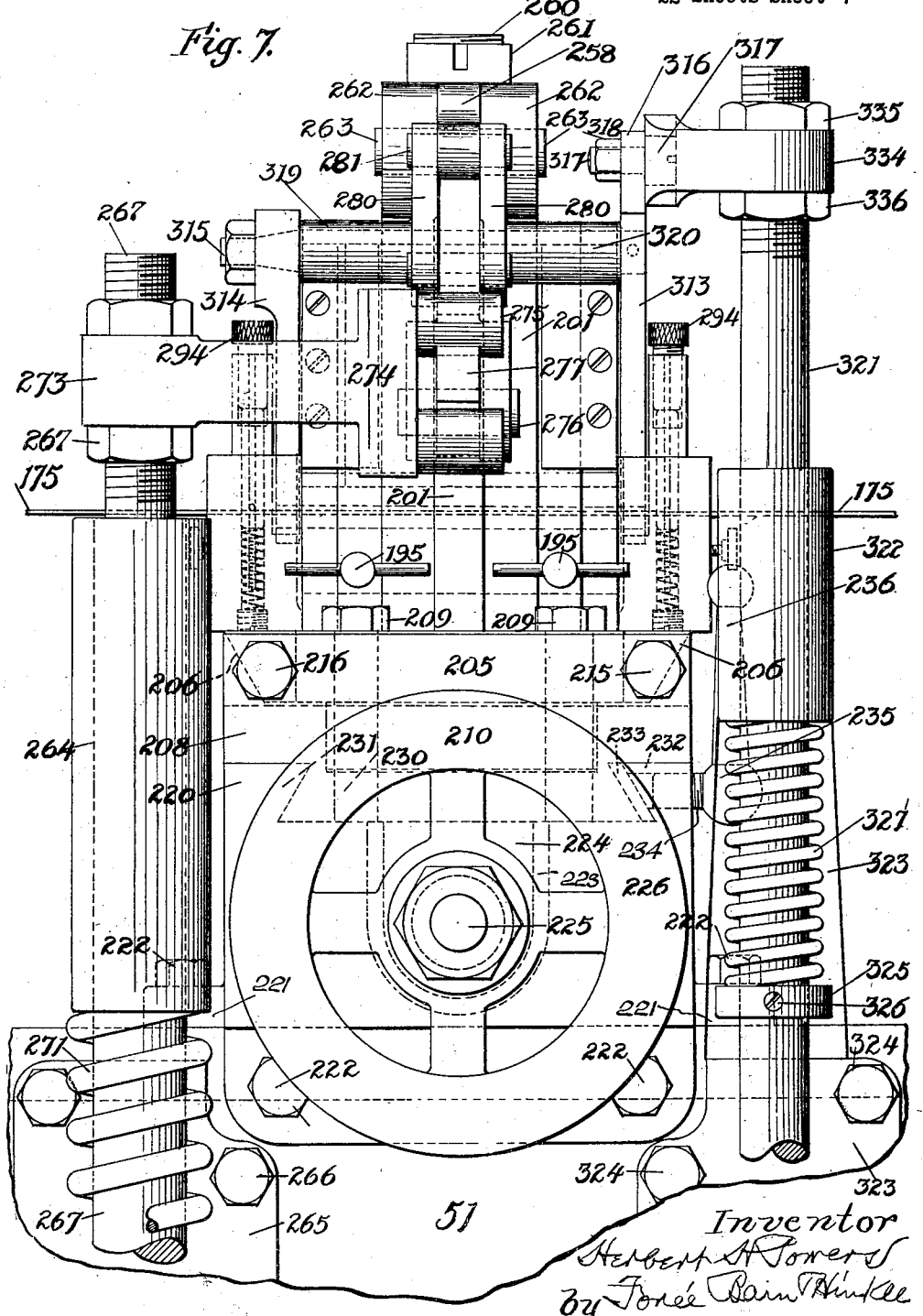
Fig. 7 is a front elevation of the vise and operating mechanism looking from the right of Fig. 6.

The member 208 (Fig. 7) is provided on its bottom with a dove-tailed guide 230 that is guided between the guide members 231 and 232, as parts on the relatively fixed member 220. A gibb 233 is adjustable by the screws 234 to take up any lost motion between the side members. A screw 235 passes thru the member 232 and is rotated by a handle 236 to clamp the members 208 and 220 together after they have been adjusted in fixed position by rotation of the hand wheel 226.

Figure 6:
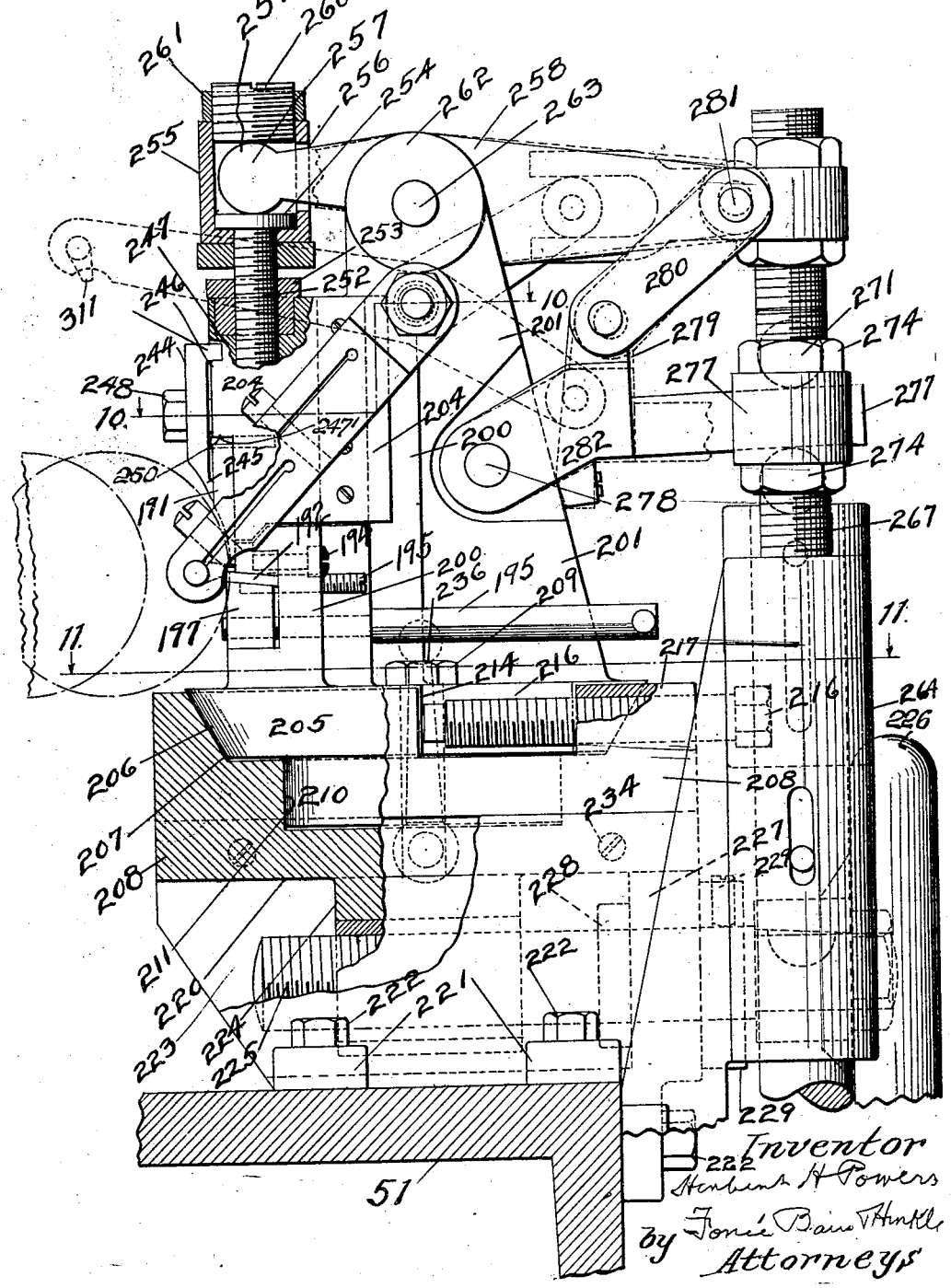
Fig. 6 is an enlarged side elevation of the saw holding vise and operating mechanism therefor with parts of the machine broken away, and parts of the vise in section.
Figure 8:
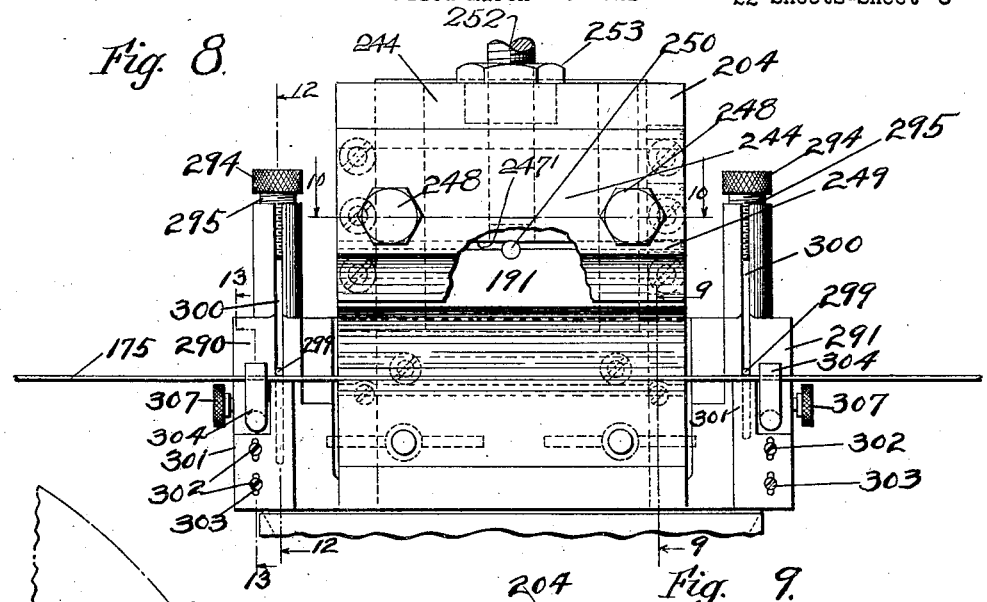
Fig. 8 is a rear elevation of the vise and wire guides.

Now, looking particularly at Figs. 6, 8 and 10, the vertical sliding member 204, which carries the upper jaw 191 of the vise, is provided with rearwardly projecting members 237 which extend back of the shoulders 238 provided on the member 200, and on their rear edges carry gibb plates 240 secured to the projections 237 by screws 241. A gibb plate or wearing plate 242, in association with the screws 243, are the means to take up lost motion between the vertically sliding members to compensate for wear.

The member 204 carries a clamping plate 244 which has a toe 245 that bears upon the upper jaw 191 to hold it in place. It also has a heel 246 that is received in a slot 247 made in the member 204 to prevent its vertical movement. The bolts 248 pass thru the clamp 244 into the member 204.

The upper jaw 191 of the vise is located under a shoulder 247' in the member 204, and between the shoulder and the upper edge of the jaw 191 is a transversely disposed hardened pin 250 located in a groove midway of the length of the jaw 191, more clearly shown in Fig. 8. The object of the pin 250 is to pivot the jaw and cause it to automatically adjust itself on the upper surface of the strand or saw wire 175, and after being once adjusted, the bolts 248 that pass thru the clamp 244 are tightened, to hold it in self-adjusted position.

Threaded into the top of the member 244 is a screw 252 which is held in vertically adjustable position therein by the nut 253. The screw is provided on its upper end with a flat head 254 which is contained within an inverted cup-shape member 255 movable with the screw. The cup-shape member is provided with a slot 256 to admit the end 257 of a lever 258. The intruding end of the lever is round, as at 259, and the lower edge of the round part of the lever bears upon the upper surface of the head 254 and the upper end bears upon the under surface of the lower end of a screw 260, that is threaded in the upper end of the cup-shape member 255 and which is held in adjusted position by the nut 261 so that the head 259 will have very little, if any, lost motion within the cavity in which it is contained.

The standard 201 is provided on its upper end with a pair of bosses 262 between which the lever 258 is pivoted by a pin 263.

*Means for automatically opening and closing the vise.*

Looking at Figs. 1, 6 and 8, a push-rod guide 264 is provided on its lower end with a plate 265, which is secured to the bed 51 by screws 266. A push-rod 267 carries on its lower end a roller 268 which bears upon a cam 269, the cam being fixed to the cam shaft 54 by a set screw 270.

An open helical spring 271 surrounds the lower end of the push-rod and bears against a collar 272 and on the lower end of the guide 264 and serves as a means for normally holding the roller 268 in intimate contact with the peripheral surface of the cam 269. The upper end of the push rod 267 is screw threaded and carries a laterally projecting arm 273 adjustably held thereon by suitable adjustable nuts, one above and one below the arm.

The arm 273 is provided on its outer end with a head 274 from which project two rollers 275 and 276. Between these rollers is an arm 277 that is pivoted by a pin 278 on the member 201. The arm 277 has a projecting portion 279 that is connected by links 280 to the outer end of the lever 258, as at 281.

The dotted lines around the arm 277 and the link 280 (Fig. 6) and the lever 258 show the extent of movement of these parts by operation of the cam 269. When the spring 271 (Fig. 7), surrounding the push-rod 267 moves the latter downwardly as far as it will go, as permitted by the cam, then the pivotal points formed by the toggle (Fig. 6), comprising the members 282, 279 and 280 are in substantial alignment, the toggle being closed, thereby depressing the end 257 of the lever 258, closing the vise on the strand and rigidly holding it closed and locked so long as permitted by the cam 269. The cam 269 is timed so as to open the vise after the cutter 90 has completed the operation upon the strand and is backed away from the saw thus formed.

The moving strand 175 is guided on each side of the vise and held with its back surface approximately against the front surface of the backing plate 193 by adjustable guides. On each side of the vise structure and as a part of the member 205 are upwardly projecting parts 290 and 291, more clearly shown in Figs. 12 and 13. The two devices are similar in all respects, I will therefore describe but one. The part 290 is bored for a vertically sliding rod 292 and in the upper threaded end of the bore 293 is an adjustable screw 295, having a head 294. The lower end of the bore is enlarged, as at 296, for a screw 297, that is used to adjust the tension of the open helical spring 298, used to yieldingly support the rod 292 in the bore.

Projecting laterally from the rod 292 is a guiding pin 299 that is movable with the pin in the slot 300, provided in the part 290. The screw 295 is provided to accurately adjust the pin 299 in contact with the upper surface of the strand 175, the lower surface of which bears upon a plate 301. This plate is held on the part 205 by screws 302 that pass thru slots 303. The screws 302 and slots 303 serve as means for raising and lowering the plate 301 to support the strand or strands at suitable height for the vise.

Means for holding the strand generally in contact with the vertical surface of the backing plate 193, consists of an adjustable arm 304 (Fig. 13), one on each side of the vise, having a shank 305 that is slidably adjustable in the bore 306 of the part 205. The shank 305 is axially adjustable in the bore 306 by screws 307 (Fig. 14). Coaxial with the axis of the screw 307 is a counterbore 308 in which is located a collar 309. The collar has a cut-away part on one side 310 for contact with the shank 305, so that when the screw 307 is tightened, it draws the collar into contact with the shank and holds arm 304 in the position in which it has been placed for the purpose of maintaining the strand or strands 175 in alignment with the backing plate of the vise.

The guides 299 and 304 hold the saw strand in its place during its movement thru the vise, but they are not sufficient to take out any kink or bend of the strand between the respective guides and in that portion which is contained between the jaws of the vise. For this purpose I provide a swinging arm clamp, more clearly shown in Figs. 9, 15 and 16.

A blade 311 is tapered and is provided at each end with bearings 312 that are rotatably adjustable in the swinging arms 313 and 314. These arms are joined together by an arbor 315 and the arm 313 extends beyond the arbor, as at 316, and carries on its extended end a filister head screw 317, held in place by means of a nut 318.

Before the jaws of the vise are tightened upon the strand 175, the swinging blade 311 is brought into contact with the front edge of the strand, as clearly shown in Fig. 9, and as the blade 311 is substantially in length equal to the width of the vise jaws any kinks that may be in the strand are thereby removed.

The arbor 315 on which the arms 313 and 314 (Fig. 7) are carried is pivotally supported in bosses 319 and 320 that extend laterally from the rib 201. The arms are moved by a push-rod 321 that has bearing in a hub 322 supported on the bracket 323. The bracket is secured to the frame member 51 by bolts 324'.

Spaced away from the boss 322 and secured to the push-rod 321 is a collar 325 fixed by a screw 326 and serving as an abutment for an open helical spring 327, having its upper end in contact with the boss 322 and its lower end in contact with the collar 325. The push-rod 321 passes thru another boss 327 (Fig. 1) which rises from the plate 323 of the bracket, and on the lower end of the push-rod is a roller 329 in contact with the peripheral surface of a cam 330, having a hub 331 fixed to the shaft 54 by set screws 332. The cam 330 produces an alternate up and down vertical motion of the push-rod 321 in proper timed relation to cause the tapered clamping member or blade 311 to make contact with the edge of the saw strand that is presented to the cutter 90, and to forcibly push it into contact with the back plate of the vise and thus remove all kinks that may be in that part of the strand.

Figure 5:
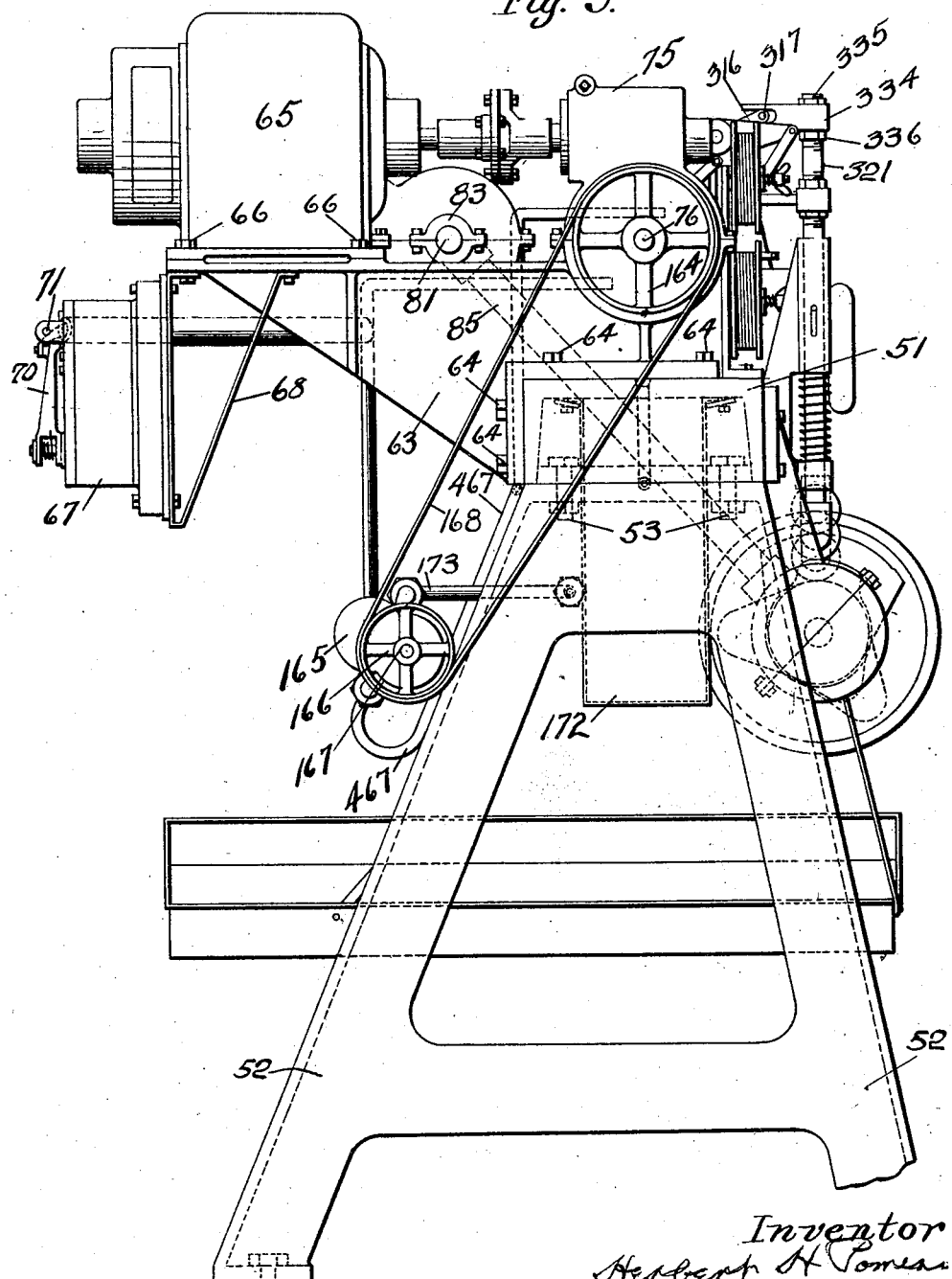
Fig. 5 is an end elevation of the power end of the machine.

An arm 334 (Fig. 7) is secured to the upper end of the push-rod 321 and is vertically adjustable thereon by means of the nuts 335 and 336. The outward end of this arm is bifurcated, as shown in Fig. 5, and contains the screw head 317 between the prongs so that when the rod 321 is raised by the cam, the bar 311 is brought forcibly to bear against the exposed edge of the saw strand 175 which at that time is located between the jaws of the vise.

The movement of the cam 330 is timed, so that the spring 327 will move the push-rod downwardly and thereby carry the swinging arm 311 out of the path of the cutting tool 90 just after the vise is finally closed upon the saw strand and just before the cutting tool 90 is moved forwardly to engage the edge of the saw strand, for the purpose of milling the teeth in that portion which is then confined within the jaws of the vise.

The arm 314 is slotted, as at 338 (Fig. 15) and a screw 339 passes freely thru the portion 340 and is threaded into the portion 341 of the arm 314. Another screw 342 is threaded in the portion 346 of the arm and bears against the upper surface of the portion 341. The object of this arrangement is to adjustably raise or lower the end 343 of the blade 311, so as to bring it into exact parallelism with the saw strand confined within the jaws of the vise. The major portion 341 of the arm 314 is also slotted as at 344, and screws 344' clamp the ends 312 of the blade 311 to hold it in adjusted position.

*Means for intermittently moving the strand.*

After the teeth have been cut in that portion of the saw strand confined in the vise, by means of the cutter 90, and the cutter has been withdrawn to its retracted position, as heretofore described, the vise is then opened in timed relation by means of the cam that raises the vise jaw 191 into position shown in Fig. 9, so that the strand 175 may then be freely moved thru the vise. The means by which the strand is intermittently moved will now be described.

Figure 2:
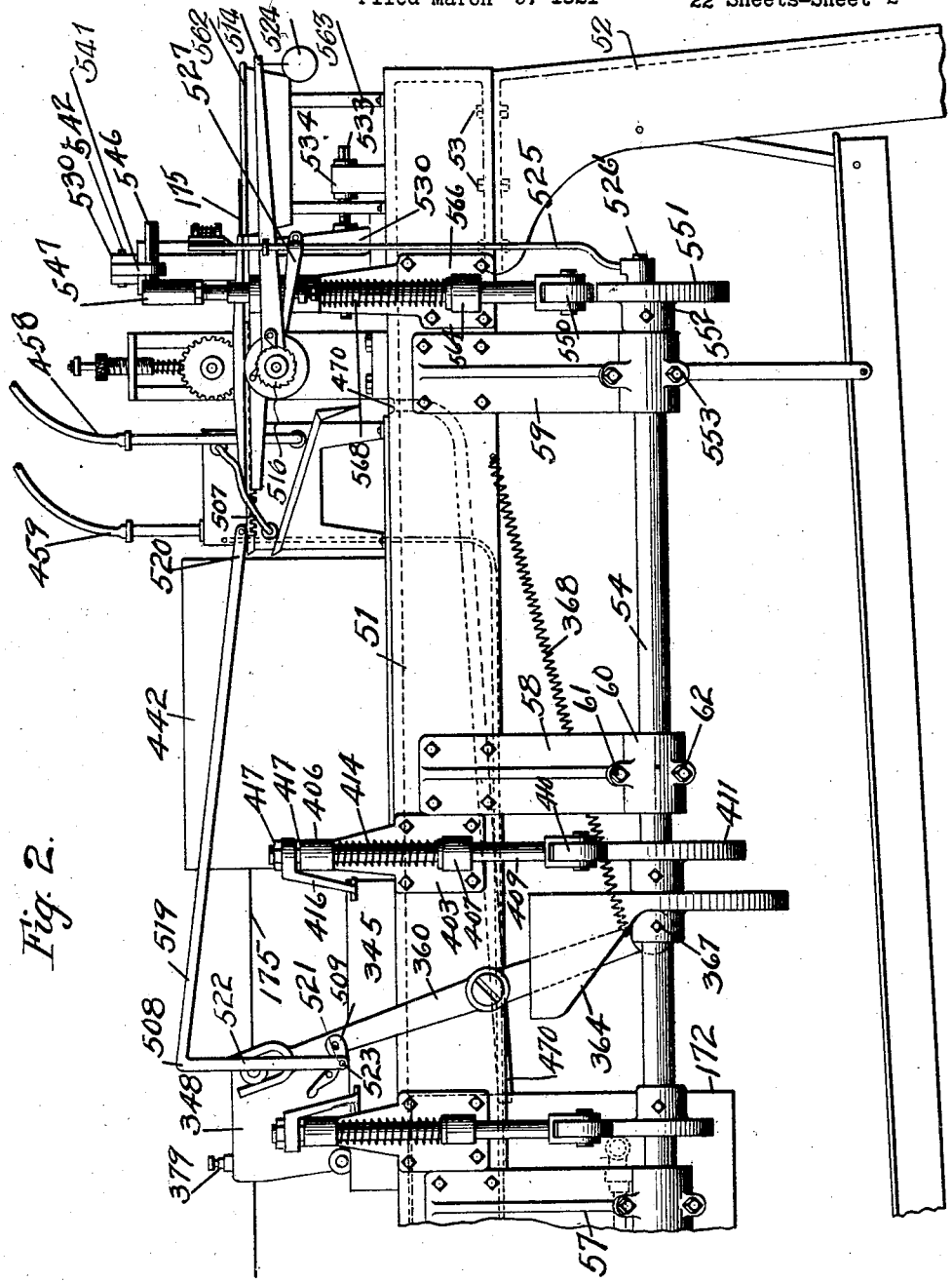
Fig. 2 is a side elevation of the other end of the machine, looking at the same side.

Secured to the bed 51, just beyond the vise toward the finishing end of the machine, Figs. 2, 26 and 27, is a track frame 345, having longitudinally extending inwardly projecting track rails, 346 and 347. A carriage 348 is mounted on the track frame 345. A portion 349 of the carriage extends between the rails and has transversely extending bosses 350, thru which extend shafts upon which are pivotally mounted wheels 351 and 352 which engage in the under grooves of the rails 346 and 347, respectively. There are similar fore and aft bosses 353 just above the bosses 350 upon which are supported other pairs of wheels 354 and 355 that extend into grooves made in the top part of the rails 346 and 347, respectively. There are pairs of such wheels on the front and the rear ends of the carriage. The plate 356 rises from this portion of the carriage and carries on its upper edge a laterally projecting stud 357, reinforced by a web 358 and which carries upon its free end a roller 359.

An oscillating lever 360 is pivoted to the frame 51 on a stud 361 and is the means by which the carriage is intermittently moved to and fro for the purpose of moving the saw strand thru the machine. The upper end of the lever 360 is bifurcated and is provided with prongs 362 and 363 between which the roller 359 is contained.

A barrel cam 364 moving in the direction of the arrow 365, and provided with a hub 366 secured to the shaft 54 by the set screw 367, is the means for moving the lever 360 into position as shown in Fig. 26, and a spring 368 is the means for moving the lever 360 in the opposite direction, as in Fig. 2, for the purpose of producing the intermittent movement of the carriage 349.

Projecting laterally from the plate 356 is a rectangular lug or plate 369, shown in Figs. 27, 29 and 30, which supports the device for clamping the saw strand to the carriage. The lug is slotted, as at 370 and 371, and two vertically slidable members 372 and 373 are movable thru the slot. The members 372 and 373 are vertically slotted, as at 374 and 375, respectively. Between the members 372 and 373 is a cross bar 376, forming one member of a clamp, and having terminal ends 377 and 378, extending into the slots 374 and 375, respectively, to prevent the member 376 from rotating. The clamping member 376 is vertically adjustable in the slot by means of a screw 379 that is adjustably held in place by a nut 380. The lower end 381 of the screw is made smaller and is provided with a groove 382 into which a pin 383 is inserted, so that when the screw 379 is moved vertically, the clamping member 376 will follow it. The screw passes thru a bridge 384 that joins the parallel vertical members 372 and 373.

A lever 385 is pivoted, as at 386, and has a boss 387 on its free end which is included between the vertically movable members 372 and 373 of the clamp structure and thru which a screw 388 passes, and by which it is pivotally connected to the vertically movable structure.

The plate or lug 369 is cut-away at 389, within which to contain a clamping bridge 390. This bridge is preferably made of hard drawn copper which is more or less yielding, and which affords good frictional contact with the under surface of the saw strand 175.

A friction reducing hardened roller 391 extends parallel with the clamping structure and its peripheral surface is slightly above the surfaces of the plate 369, so that when the saw strand is clamped it is bent downwardly between the clamping members, the object being to permit the saw to be raised somewhat above the clamping member 390 at the time when it is released, so that the teeth of the saw will be free from contact with any of the surfaces of the clamping structure.

A stud 392 extends forwardly of the plate 356 and passing thru the stud is an arbor 393, on one end of which is secured a lever 394 by a pin 395. The lever 394 is pivoted in its axial center and is provided on each of its ends with rounded portions 396 and 397, respectively. Secured to the other end of the arbor 393 is an arm or link 398, as by a pin 399. This lever or arm 398 forms one member, or link of a toggle; the other member or link 400 is pivoted to the outer end of the lever or link 398 as at 401, and the other end is pivoted to the lever 385, as at 402. In Fig. 26 the toggle is shown broken, or open, and the clamping member 376 is raised from the wire or saw strand, and therefore, the strand is free and the carriage is in condition to be returned to the left once more to clamp the saw strand prior to again moving it to an extent somewhat greater than the finished length of the saw made by the machine. The toggle thus described is closed and opened at the respective ends of the excursions of the carriage 348, by a means now to be described.

A bracket 403, Figs. 26 and 27, is secured to the frame 51, as by screws or bolts 405. It is provided with push-rod bearings 406 and 407 for a push-rod 408. A keyway or spline 409 is provided in the rod 408 and bearing 407 prevents rotation of the rod. The rod carries on its lower end a roller 410 which has bearing on the peripheral surface of the cam 411, the latter providing a hub 412 which is secured to the cam shaft 54 by a set screw 413.

An open helical spring 414 surrounds the midportion of the push-rod and bears against the bearing 406 and a collar 415 which is provided on the rod. This spring normally maintains the roller 410 in contact with the peripheral surface of the cam 411. At the upper end of the push-rod 408 is a downturned arm 416 adjustably secured on the threaded end of the rod by means of the nuts 417. As shown in Fig. 26, the rod is in its highest position with the spring 414 compressed and the lever 394 which controls the toggle referred to has been raised by a laterally extending foot 418 which is shown under the end 396 of the lever 394. By observing the cam 364 it will be seen that the carriage is about to be started moving towards the left as in Fig. 2, by the instrumentality of the tension spring 368. The distance that it will be moved to the left is a litter greater than the finished length of the saw and in this retrograde movement the saw strand 175 is not disturbed. When it has been moved to the left, as described, the lower end 397 of the lever 394 will rest above the lateral extension or foot 419 on the downturned arm 420, which is adjustably fixed to the upper end of the push-rod 421 by the nuts 422 and 423. The push-rod is guided in bearings 424 and 425 on the bracket 426, which is secured to the frame 51 by bolts 427.

A spring 428 is the means for maintaining the roller 429 on the upper surface of the cam 430, and the latter is provided with the hub 431, secured to the cam shaft by a set screw 432.

In proper timed relation the push-rod 421 will be raised by the cam 430, whereupon the projection 419 being under the end 397 of the lever 394 will lift the lever and close the toggle, consisting of the links 398 and 400, thereby gripping the saw strand by means of the clamping device more clearly shown in Figs. 29, 30, and 31, and heretofore described.

After this operation has been performed the cam 364 will once more engage the lever 360 and move the carriage back to the position shown in Fig. 26, carrying the saw strand with it, after which sequence of operation is repeated in proper timed relation with other operative parts of the machine.

The lower end of the lever 360 carries a roller 433, in Fig. 28, rotatable upon a pin 434 which passes thru an elongated slot 435 made in the end 436 of the lever 360. The slot 435 is just as wide as the diameter of the bolt or screw 434, but is longer to permit some lateral movement of the bolt 434 therein, for the purpose of accurately adjusting the movement of the lever 360 with respect to the cam 364. To this end screws 437 pass into the slot from opposite sides of the lever and are held in adjusted position by the respective nuts 438. A washer 439 passes over the threaded end of the bolt 434 and rests upon the lever thereby bridging the slot and a shoulder 440 made upon the bolt 434 bridges the slot on the other side, so that tightening the nut 441 will not bind the roller 433 against the edge of the lever 360.

Fig. 2 shows the position of the carriage 348 after it has been moved from the position shown in Fig. 26. It also shows the position of the parts when the saw strand has been clamped to the carriage.

The oven for heating the saw.

The part of the strand, upon which teeth have been cut and which subsequently is to constitute one of the saws, occupies the oven 442 to be heated (Figs. 36 and 37), for the purpose of tempering it. The oven 442 is made of fire brick, or the like, having a combustion chamber 443, made preferably inside of a metal housing 444 that may be secured to the bed 51 by screws 445. A longitudinally extending muffle 446 made of suitable refractory material is contained within the furnace and on either side and above are heat conducting pasageways 447 for the heat that is injected into the combustion chamber by the nozzle 448 thru which air under pressure from the pipe 450 is projected accompanied by gas that is introduced by the pipe 449. A pyrometer 451 may be introduced into the chamber 452 made in the muffle 446 and in which the saw is contained for the purpose of heating it prior to quenching it in the process of tempering. A damper 452' is adjustable to admit a greater or less quantity of air thru the orifice 453 into the combustion chamber 443. The combustible fuel coming from the nozzle 448 should produce just sufficient heat to raise the temperature of the saw blade contained in the furnace to the proper degree during the time interval between the moving impulses imparted to the saw strand by the instrumentality heretofore explained.

Saw hardening device.

Located immediately adjacent the furnace 442 is a saw hardening means 453 so that during one movement of the strand the saw is transferred from the furnace to the hardening means, while it is yet hot.

Mounted upon the legs 455, Figs. 38 and 39, is a water tank 456. The tank is completely closed, having an upper flat wall 457. The water enters by the pipe 458, near the bottom of the tank, and overflows thru a pipe 459 which is located upon the top of another closed tank 460, the water from the tank 456 passing into the tank 460 thru the hose or pipe 461.

A flat rectangular steel plate 462 rests upon the flat wall 457 of the tank 456 in a receptacle for containing oil, having outwardly flared walls 463. Another flat rectangular plate 464, substantially the same dimensions as the plate 462, stands upon four adjustable legs provided by the screws 465 that are received in four orifices 466 in the plate 463, so that the space between the plates may be accurately adjusted by movement of the screws 465. The plates 462 and 464 are maintained at a low temperature by the water that is contained in and circulates through the tanks 456 and 460. Oil from the pump 165 is brought thru the pipe 467 and is deposited in the receptacle in which the plate 462 is contained. After the receptacle has been filled to the brim with oil, the oil overflows and is caught in an inclined gutter 468 that surrounds the tank 465, from which it passes thru a spout 469 into a return pipe 470 which extends to the oil tank 172 located below the frame 51. The saw blade, therefore, while in the hardening bath, is entirely covered with the quenching oil which prevents destructive oxidation of the blade during the hardening process.

It is quite necessary that the saw strand should be pulled from the point nearer the finishing end and beyond the heating and tempering means by some means that will move in unison in time and extent with the carriage 348 and which is auxiliary to the movement performed by the carriage, the latter bearing the greatest burden of the work. To this end Figs. 41 and 42 show the

Auxiliary means for moving the saw strand.

Mounted upon the base 51 is a frame base 471 on the frame structure 472, having two parallel uprights 473 and 474 joined at their upper ends by a cross bar 475 and slotted from their upper ends downwardly to points 476 to contain rectangular blocks 477 and 478 thru which an arbor 479 passes and which carries a feed roller 480 secured to the arbor by a key 481 and located between the two uprights.

A gear wheel 490 is secured on the arbor by a key 491 and a collar 492 at each end is held on the arbor by a tapered pin 493 to prevent axial movement of the arbor.

Rising from the base 471 is another standard 494, and an arbor 495 passes thru the standards 473, 474 and 494. It bears another feed wheel 496 which is contained between the standards 473 and 474 and a gear wheel 497 has a hub 499 that is secured to the arbor 495 by a tapered pin 401. Hubs 499 and 500 are each secured to the arbor 495 by tapered pins 501.

At the top of the bearing blocks 477 and 478 is a tensioning device for bringing the rolls 480 and 496 into yielding contact for the purpose of pulling the saw strand 175. Threaded into each of the rectangular bearing blocks 477 and 478 are stems 502 connected together by a cross piece 503 at their top ends and surrounding each of the stems is a spring 504, one end of which bears upon the respective bearing block and the other end against the lower surface of a hollow adjusting screw 505. The adjusting screws 505 is for the purpose of increasing the tension of the springs 504 for positively pressing the roller 480 into contact with the roller 496, so that when the shaft 495 is rotated the saw strand 175, located between the rollers, will be intermittently pulled thru the machine.

Extending laterally from the standard 494, on the outer side thereof, is a rack guide 506, in which is contained a reciprocatable rack 507. The rack meshes with a gear 508 that is loose on the shaft 495 and which carries a disk 509 secured thereto by screws 510. The disk 509 carries a pawl 511 which cooperates with a ratchet wheel 512. The ratchet wheel 512 is secured to the shaft 495 by pins 513. A lever 514 is loose on the shaft 495 which carries a pawl 515. This pawl engages another ratchet wheel 516 that is secured to the shaft by a pin 517. A collar 518 is secured to the shaft by a tapered pin to maintain the parts in their proper positions.

Pivoted to the lever 360 (Fig. 2), which is connected to the carriage 348 that is used for moving the strand 175, is an arm 519 which at its lower end 520 is pivoted to the rack 507. The arm is bent at right angles, as at 508, so that it may extend over the top of the push-rod 409. The lower end of the arm is connected to a short arm 521 that is pivoted to the lever 360, the extended end of the short arm 521 is pivoted to the lower end of the vertical part 522 of the arm 519, as at 523. The short arm 521 is adjustably rotated for the purpose of adjusting the position of the rack 507 with reference to the carriage 348 so that the two devices will move in unison with respect to the movement of the strand.

Now it will be manifest that when the lever 360 is returned from the position shown in Fig. 2 to the position shown in Fig. 26, that the rack will be reciprocated and that the rollers 380 and 496 will be rotated by the means heretofore described, and that when the arm 519 is moved back again the rack 507 is returned to its retracted position and the pawl 511 will move idly over the ratchet wheel 512.

The lever 514, more clearly shown in Fig. 41, carries on its outer end a rather heavy weight 524, to move the lever downwardly when released.

A vertically movable push-rod 525 is pivotally connected eccentrically to the cam shaft 54, as at 526, and carries near its upper end an arm 527. Just after the rack 507 has been reciprocated to move the strand, the push-rod 525 is raised and with it the arm 527 is raised. It will be observed, from inspection of Figs. 41 and 44, that the arm 527 extends under the lever 514 near the fulcrum of the latter and when the rod 525 is raised, the lever 514 carrying the weight 524 is also raised after which the crank 526' will lower the arm 525 leaving the lever 514 in its raised position, but the weight 524 will cause the lever 514 to descend to its lowest position, determined by the set screw 529, whereupon the pawl 515 engaging the ratchet wheel 516 will rotate the shaft 495 slightly, to a greater extent than it was rotated by the rack 507. The rollers 480 and 496 will therefore be rotated and the strand 175 will be held under tension to take out any kinks that may have been caused by heating and tempering.

It is now necessary to sever the completed saw from the strand and in the process of making the saw there is an intermediate longitudinal portion lying between adjacent saws that has not been tempered and therefore is soft and this part is cut out from the strand so as to leave the saws tempered throughout their entire lengths.

*Means for severing the saws from the strand.*

Figure 45:
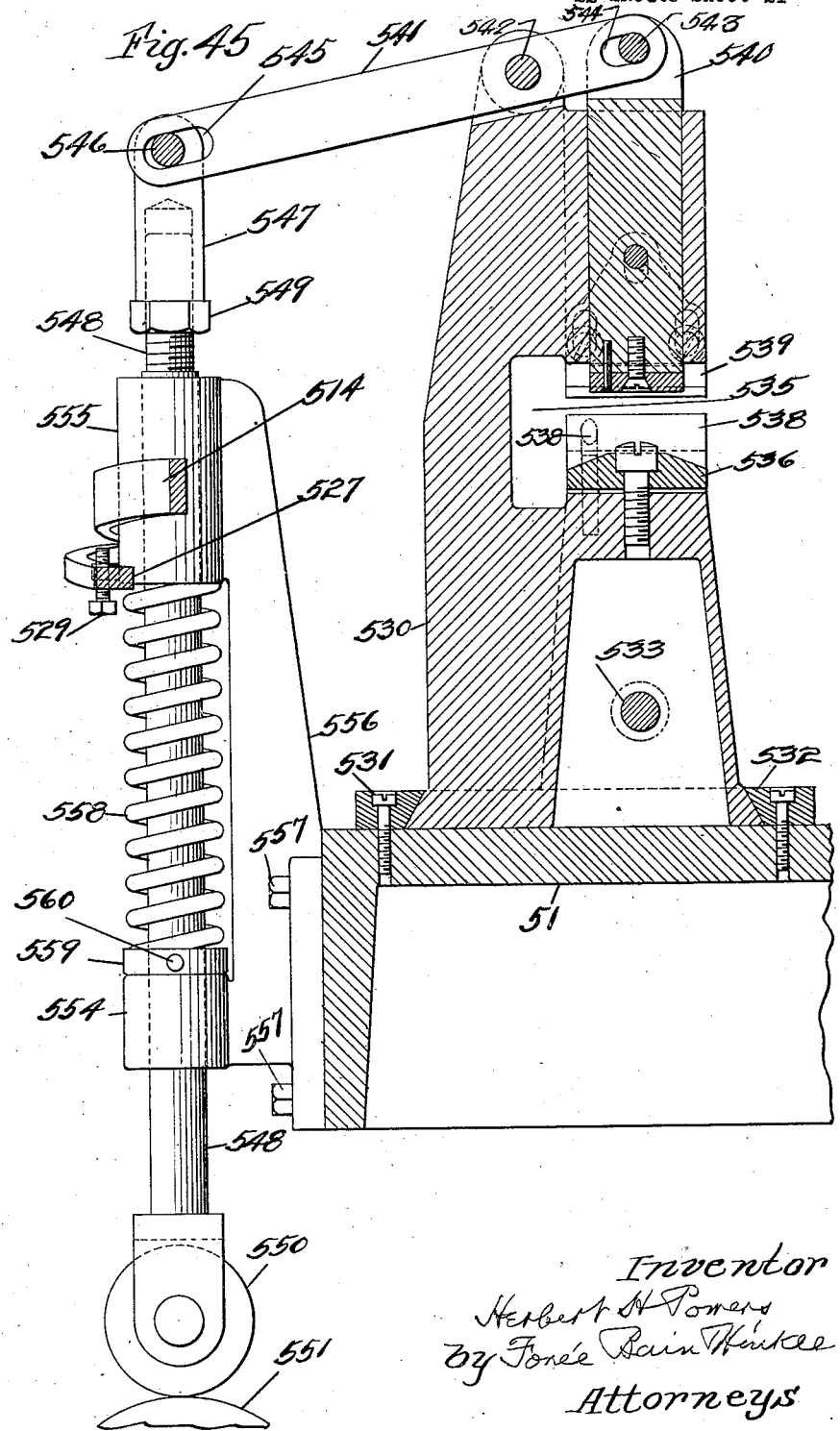
Fig. 45 is a section taken on line 45—45 of Fig. 41.

A frame 530 (Fig. 45) is slidably mounted upon the base 51 between guides 531 and 532. A screw 533 has threaded engagement with the frame 530 that is supported by a standard 534. The object of shifting the frame 530 is to move the cutting instrumentality to the proper position with respect to the strand and the finished saw so that the intermediate soft portion of the strand will be properly cut therefrom and that the saws will be of uniform length.

The frame 530 has a gap 535 within which is fixed a member 536 of the cutting tool. The tool member 536 is U-shape in cross section having two cutting edges 538 between which the reciprocating member 539 passes in the act of cutting away a part of the strand. Between the members 538 and the base of the member 536 it is tapered, as at 539, so that the pieces cut from the strand will slide out from between the members 538.

Secured to the upper cutting member 539 is a reciprocating member 540 moved by the lever 541 that is pivoted at 542 to the frame 530. It is pivoted to the reciprocating member 540 by a pin 543 which passes thru slots 544. The outer end of the lever 541 is slotted, as at 545, and passing thru the slot is a pin 546 from a vertically adjustable part 547 that is threaded on the upper end of the push rod 548 and held in adjusted position by the nut 549. The push-rod carries on its lower end a roller 550 which bears upon a cam 551, the hub of which 552 is secured to the cam shaft 54 by the set screw 553. The push rod 548 is guided in bearings 554 and 555 that project from the bracket 556, the latter being secured to the frame 51 by screws 557.

An open helical spring 558 has its lower end bearing against the collar 559 that is fixed to the push rod 548 by a pin 560 and the upper end of the spring bearing against the lower end of the bearing 555.

Inasmuch as the frame 530 is frequently moved to and fro along the base 51 the pin 546 is made sufficiently long to prevent disengagement with the pivoted lever 541.

The cam 551 is so adjusted upon the cam shaft 54 that the cutting instrumentality will sever the saw from the strand at the time when the strand is standing still, and while a portion of it is being tempered, another portion is being hardened, and another portion is being milled by the cutter for the purpose of providing the teeth in the saw.

When the saws have been cut from the strand, in the manner described, they fall in and are caught by a pan 562 which is supported at the finishing end of the machine on legs 563.

Reverting now to the oil tank 172 it will be observed that it contains a series of partitions 564, 565 and 566 formed of screen 567 to screen or filter the oil that may be passed into the tank. At the point where these partitions are located are spaced apart cleats 568 and the screen wire 569 has around its edges a yielding packing material 570, so that the oil passing from one compartment to another must necessarily pass thru the screened partitions.

The oil tank has bounding its upper edge, a flange 571, for holding the tank in position by cleats 572 that engage the flanges and are held by the screws 573.

The space in the tank left below the pipe 173 is for containing sediment that may settle to the bottom of the tank and which is mechanically carried in suspension in the oil. At suitable times the tank may conveniently be removed from the machine and the partitions taken out and the tank emptied and cleansed of the sediment that may have accumulated.

In the means for chilling and tempering the teeth-containing sections of the saw strand there are two spaced apart metal plates 462 and 464 between which the saw strand is drawn, after the teeth-containing sections have been heated in the oven. These plates are maintained cold by circulation of water thru the tanks 456 and 458. The teeth of the saw are more rapidly chilled by their contact with the plates than the back of the saw; therefore the teeth are hard and the back is relatively elastic. It is the cooled plates that chill the saw, the oil serves as a blanket to exclude the oxygen from contact with the metal of the saw and the circulation of oil removes any moisture that might seep thru or condense on the confronting surfaces of the plates and injure the saw blades.

While I have herein shown a single embodiment of my invention for the purpose of clear disclosure, it will be manifest to persons skilled in the art, that considerable change in the arrangement and configuration of the parts within the scope of the appended claims.

Having described my invention what I claim as new and desire to secure by Letters Patent, is:—

1. The method of making saws which consists in supporting the full width of a blade on both sides and one edge, and milling all of the teeth in the opposite edge at one pass of the milling cutter, while at the same time cutting through the side supports for the blade.

2. The method of making saws which consists in supporting a blade on both sides and one edge and milling all of the teeth in the opposite edge and in both side supports at one pass of the milling cutter.

3. The method of making saws which consists in providing a continuous strand of which a series of saws are to be made, milling all of the teeth of each saw at one pass of the cutter for each milling operation, and giving a finishing cut toward the end of the milling operation.

4. A saw making device for operating on a strip of indefinite length, jaws engaging the sides of the strip in the region where the teeth are to be formed, means for backing an edge of the strip, means to engage the strip beyond the teeth cutting region thereof to hold the strip against the backing means, and a cutter for milling the teeth on the other edge of the strip.

5. In a machine for making a series of saws from a continuous strand, a vise having jaws arranged to contact the full width of both sides of the strand throughout the entire length of the saw, a backing plate of equal length, means to force the strand into contact with the entire length of the backing plate, a rotating milling cutter arranged to cut the teeth and to coincidentally cut the teeth in the jaws of the vise, means to move the cutter into contact with the strand, means to feed one jaw of the vise towards the cutter, and means to close the jaws of the vise to clamp the strand just before the beginning of the milling operation.

6. In a machine for milling all of the teeth of a saw at one operation, the combination of a vise having clamping jaws equal in length to the series of teeth to be cut, a backing plate against which the back of the saw must contact, a milling cutter having as many circumferential rows of teeth as are to be contained in the saw and a soft plate to underlie the saw blade, having as many teeth as the cutter, to back up each individual tooth of the saw.

7. In a machine for milling all of the teeth of a saw in one operation, the combination of a vise having clamping jaws equal in length to the series of teeth to be cut, a backing plate against which the back of the saw must contact, a milling cutter having as many circumferential rows of teeth as are to be contained in the saw, a soft plate to underlie the saw blade, having as many teeth as the cutter, to back up each individual tooth of the saw, means to advance the cutter to cut the teeth in the saw and means to further advance it in smaller increments after reaching the soft plate, to cut part of the latter and to remove burs from the teeth.

8. A machine for cutting saw blades from a continuous strip of metal comprising a frame, a transversely movable cutter head carried thereby, a clamping mechanism comprising a movable jaw for clamping a face of the saw strip, a backing member movable transversely thereto for backing the other face of said saw strip, and means for feeding said strip.

9. A machine for cutting saw blades from a continuous strip of steel comprising a clamping mechanism composed of jaws pressing upon the opposite faces of the strip for the full width thereof, means for positioning said strip in an edgewise direction, a rotatable cutter head and means for bringing said head into position to cut through an edge of said strip and said jaws, and means for imparting a transverse movement to said head while in contact with said strip and jaws.

10. A machine for forming saw blades from a continuous strip of steel comprising a feed mechanism, an adjustable member on which rests the strip, means for alining said strip laterally, means for clamping said strips, means for holding said alining means against the strip during cutting operation, and a cutter head adapted to move transversely across the edge of said strip to cut teeth therein.

11. A machine for forming saw blades from a continuous strip of steel comprising a gripping mechanism, a feed mechanism operative when said gripping mechanism is released, adjustable arms bearing against an edge of said strip for the purpose of alining the same, and holding the same during the cutting operation, a rotatable cutter, means for moving said cutter transversely across the edge of said strip, and means for holding said arms against said edge of the strip during the operation of said cutter.

12. A machine for forming saw blades from a continuous strip of steel comprising a clamping mechanism, means for alining said strip in an edgewise direction, a cutter for forming the teeth, means for holding said alining means against the strip beyond the path of said cutter, and means for moving said cutter transversely across the edge of said strip.

13. A machine for forming saw blades from a continuous strip of steel comprising a clamping means for said strip, a feed mechanism for moving said strip the length of one blade, a cutter and means for moving said cutter transversely to cut the edge of said strip and said clamping means.

14. A machine for forming saw blades from a continuous strip of steel comprising a feed mechanism, an adjustable member on which rests the strip, means for alining said strip laterally, means for clamping said strip, means for holding said alining means against the strip during the cutting operation, and a cutter head adapted to move transversely across the edge of said strip to cut teeth therein.

15. A machine for forming saw blades from a continuous strip of steel comprising a gripping mechanism, a feed mechanism operative when said gripping mechanism is released, an alining device for alining the edge of said strip while said gripping mechanism is released, a rotary cutter head adapted to move transversely across the edge of said strip, and means for holding the alining device against said strip during the cutting action of the cutter.

16. A machine for forming saw blades from a continuous strip of steel comprising a clamping means for said strip, a cutter, and means for moving said cutter transversely across the edge of said strip and through a part of said clamping means.

In testimony whereof I hereunto subscribed my name.

HERBERT H. POWERS.